(12) United States Patent
Shimizu et al.

(10) Patent No.: US 9,983,001 B2
(45) Date of Patent: May 29, 2018

(54) SHAPE ANALYSIS METHOD AND SHAPE ANALYSIS PROGRAM

(71) Applicant: MITUTOYO CORPORATION, Kawasaki-shi, Kanagawa (JP)

(72) Inventors: Masafumi Shimizu, Kawasaki (JP); Yoichi Saito, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 723 days.

(21) Appl. No.: 13/932,350

(22) Filed: Jul. 1, 2013

(65) Prior Publication Data

US 2014/0005978 A1    Jan. 2, 2014

(30) Foreign Application Priority Data

Jul. 2, 2012 (JP) .................................. 2012-148463

(51) Int. Cl.
*G01B 21/20* (2006.01)
*G01B 5/008* (2006.01)
(Continued)

(52) U.S. Cl.
CPC .............. *G01B 21/20* (2013.01); *G01B 5/201* (2013.01); *G01B 5/24* (2013.01)

(58) Field of Classification Search
CPC .......... G01B 21/20; G01B 5/24; G01B 5/201; G01L 35/24
(Continued)

(56) References Cited

U.S. PATENT DOCUMENTS

2001/0027381 A1* 10/2001 Kikuchi ................. G01B 21/04
702/155
2005/0263727 A1* 12/2005 Noda ..................... G01B 5/008
250/559.29
(Continued)

FOREIGN PATENT DOCUMENTS

CN          1816729 A     8/2006
CN        101526484 A     9/2009
(Continued)

OTHER PUBLICATIONS

Japanese Office Action dated Apr. 26, 2016, English translation included.
(Continued)

*Primary Examiner* — Eman Alkafawi
(74) *Attorney, Agent, or Firm* — Rankin, Hill & Clark LLP

(57) ABSTRACT

A shape analysis method for analyzing shape data acquired by measuring a contour shape of a workpiece to be measured, includes: deciding a geometric element used in shape analysis; deciding one data point to be included in an evaluation range; applying the geometric element to an interval including the one data point; searching the widest interval for satisfying a threshold condition of a preset shape tolerance while changing a width of the interval; pinpointing two boundary points between which the interval found by the search is sandwiched; obtaining two edge points at which the two boundary points are respectively shifted by preset shift amounts; setting a range sandwiched between the edge points in the evaluation range; and targeting the shape data within the evaluation range for calculation of geometric properties.

7 Claims, 40 Drawing Sheets

(51) Int. Cl.
*G01B 5/20* (2006.01)
*G01B 5/24* (2006.01)

(58) Field of Classification Search
USPC .................................................. 702/167, 168
See application file for complete search history.

(56) References Cited

U.S. PATENT DOCUMENTS

| | | | |
|---|---|---|---|
| 2006/0161382 A1 | 7/2006 | Kaneyasu et al. | |
| 2007/0097381 A1* | 5/2007 | Tobiason | G01B 11/25 356/604 |
| 2007/0271803 A1* | 11/2007 | Ishikawa | G01B 5/008 33/503 |
| 2010/0313436 A1* | 12/2010 | Nakayama | G01B 5/201 33/558 |
| 2011/0005095 A1* | 1/2011 | Nakayama | G01B 3/008 33/556 |
| 2011/0218763 A1* | 9/2011 | Sakurada | B23Q 17/20 702/167 |

FOREIGN PATENT DOCUMENTS

| | | |
|---|---|---|
| JP | 11-118444 | 4/1999 |
| JP | 2006-214870 | 8/2006 |
| JP | 2008-116392 | 5/2008 |
| JP | 2012-032341 | 2/2012 |
| WO | 97/20187 | 6/1997 |
| WO | 2007/037032 | 4/2007 |

OTHER PUBLICATIONS

Chinese Office Action dated Jun. 14, 2017, English translation included, 8 pages.

* cited by examiner

FIG. 12

CIRCLE

| | |
|---|---|
| FIRST PRIORITY | x-DIRECTION RANGE |
| SECOND PRIORITY | z-DIRECTION RANGE |
| THIRD PRIORITY | RECTANGULAR RANGE |
| FOURTH PRIORITY | DATA STRING DIRECTION RANGE |

LINE

| | |
|---|---|
| FIRST PRIORITY | x-DIRECTION RANGE |
| SECOND PRIORITY | z-DIRECTION RANGE |
| THIRD PRIORITY | RECTANGULAR RANGE |
| FOURTH PRIORITY | DATA STRING DIRECTION RANGE |

POINT (PEAK POINT/BOTTOM POINT)

| | |
|---|---|
| FIRST PRIORITY | x-DIRECTION RANGE |
| SECOND PRIORITY | z-DIRECTION RANGE |
| THIRD PRIORITY | RECTANGULAR RANGE |
| FOURTH PRIORITY | DATA STRING DIRECTION RANGE |

*FIG. 13*

SETTING OF SHIFT AMOUNT

CIRCLE

| | |
|---|---|
| x-DIRECTION SHIFT AMOUNT | 1.0mm |
| z-DIRECTION SHIFT AMOUNT | 1.0mm |
| DATA STRING DIRECTION SHIFT AMOUNT | 1.0mm |

LINE

| | |
|---|---|
| x-DIRECTION SHIFT AMOUNT | 1.0mm |
| z-DIRECTION SHIFT AMOUNT | 1.0mm |
| DATA STRING DIRECTION SHIFT AMOUNT | 1.0mm |

POINT (PEAK POINT/BOTTOM POINT)

| | |
|---|---|
| x-DIRECTION SHIFT AMOUNT | 1.0mm |
| z-DIRECTION SHIFT AMOUNT | 1.0mm |
| DATA STRING DIRECTION SHIFT AMOUNT | 1.0mm |

FIG. 14

| | EVALUATION TARGET PROPERTY | | FIRST ELEMENT | SECOND ELEMENT |
|---|---|---|---|---|
| PRIMARY PROPERTY | (1) | COORDINATE OF POINT / COORDINATE OF PEAK POINT / COORDINATE OF BOTTOM POINT | POINT | NONE |
| | | COORDINATE OF PEAK POINT | POINT | NONE |
| | | COORDINATE OF BOTTOM POINT | POINT | NONE |
| | (2) | LINE (STRAIGHTNESS) | LINE | NONE |
| | (3) | CIRCLE (ROUNDNESS) | CIRCLE | NONE |
| | (4) | COORDINATE OF POINT OF INTERSECTION | LINE 1 OR CIRCLE 1 | LINE 2 OR CIRCLE 2 |
| | (5) | TANGENT | POINT 1 OR CIRCLE 1 | POINT 2 OR CIRCLE 2 |
| SECONDARY PROPERTY | (6) | CONTACT CIRCLE | LINE 1 | LINE 2 OR CIRCLE 2 |
| | (7) | STEP | LINE 1 | LINE 2 OR CIRCLE 2 |
| | (8) | DISTANCE | POINT 1, LINE 1 OR CIRCLE 1 | POINT 2, LINE 2 OR CIRCLE 2 |
| | (9) | ANGLE | LINE 1 | LINE 2 OR CIRCLE 2 |

SHAPE ANALYSIS METHOD AND SHAPE ANALYSIS PROGRAM

CROSS-REFERENCE TO RELATED APPLICATION (S)

This application is based upon and claims the benefit of priority from Japanese Patent Application No. 2012-148463, filed on Jul. 2, 2012, the entire contents of which are incorporated herein by reference.

BACKGROUND

1. Field of the Invention

The present invention relates to a shape analysis method and a shape analysis program. Concretely, the invention relates to the shape analysis method for analyzing shape measured data obtained by measuring a contour shape of a workpiece to be measured and calculating or evaluating geometric properties such as roundness, a center position or dimensions of the contour shape. More particularly, the invention relates to the art of specifying an evaluation range in the case of analyzing a shape.

2. Description of the Related Art

Various shape measuring apparatuses for measuring a contour shape of a workpiece to be measured are known. Contour shape data of the workpiece to be measured is obtained by extracting a contour from image data imaged or scanning a surface of the workpiece to be measured by, for example, a contact probe or a non-contact probe. In addition, the shape measuring apparatuses have various names or kinds such as a three-dimensional coordinate measuring machine, a roundness measuring machine or a surface roughness measuring machine, but any devices capable of measuring the contour shape of the workpiece to be measured even when names or applications differ are included in the shape measuring apparatuses.

It may become necessary to analyze measured data obtained by measurement by the shape measuring apparatus and evaluate working accuracy of the workpiece to be measured. For example, it becomes necessary to evaluate straightness, curvature, a center position of a circle of curvature, dimensions, etc. in a certain range in the measured data. Hence, the shape measuring apparatus may have functions of applying a geometric element to a certain range in measured data or calculating straightness, curvature, a center position of a circle of curvature, dimensions, etc. of the measured data based on the applied geometric element (for example, JP-A-2006-214870, JP-A-2008-116392 and JP-A-11-118444).

Here, the geometric element refers to a geometric shape such as a straight line, a circular arc, a circle or a rectangle. In the present specification, application of the geometric element to measured data in a certain range or calculation of a size, a shape, a position, etc. of the geometric element may be represented as "calculation of geometric properties". Further, in addition to primary geometric properties of directly calculating an individual geometric element, secondary geometric properties may be computed by further computation from numerical values indicating these primary geometric properties. Examples of the secondary geometric properties include, for example, coordinates of a point of intersection between one straight line and another straight line, or a distance between a center point of one circular arc and a center point of another circular arc.

In the present specification, a computation program for calculating geometric properties based on measured data may be called a "PART program".

Now, it is necessary to specify, for example, a kind of geometric element or a range of data targeted for computation in the case of evaluating accuracy of work from the measured data. Conventionally, a user has inputted specification of the kind of geometric element or the range sequentially manually.

A Conventional procedure will be described briefly.

It is assumed that the target work has a shape as shown in FIG. 35. When this work is measured, as shown in FIG. 36, an upper surface will obtain a data string having a horizontal linear line portion L1 from the left end, a downwardly convex circular arc portion C1 continuous with the line portion L1 and further a linear line portion L2 continuous with the circular arc portion C1.

The data string is displayed on a display screen as shown in FIG. 36. Then, it is herein evaluated whether the circular arc portion C1 is worked so as to have curvature or a center point as designed.

First, a range targeted for evaluation must be specified.

In the case of specifying a range of an x-axis direction, two cursors 21, 22 in a longitudinal direction (z direction) are moved and a range sandwiched between the two cursors 21, 22 is specified as the x-direction range as shown in FIG. 37. In the case of setting a range of a z-axis direction, two cursors 23, 24 in a transverse direction (x direction) are moved and a range sandwiched between the two cursors 23, 24 is specified as the z-direction range as shown in FIG. 38. Then, a data string in a rectangular range set thus is specified as a geometric element so as to apply a "circle". Then, the PART program performs computation in which a circular shape is applied to the data string in the range specified. Accordingly, a radius r of a perfect circle including the circular arc C1, coordinates of a center point O, a deviation from a perfect circle, etc. are calculated as shown in FIG. 39. Such geometric properties are calculated with respect to the line portion L1, the line portion L2, etc. in addition to the circular arc portion C1. In this manner, a shape of the measured data is evaluated.

In the case of evaluating the shape, an evaluation range must be specified as described above, but in this case, the x range and the z range must be specified and operation of plural inputs is required. Such input operation is very complicated and has a problem of requiring time and effort. Inexperience takes considerable time and further, plural evaluation targets require substantial time.

Also, when a user specifies an evaluation range manually each time, the evaluation range differs every user, and even for the same user, the evaluation range differs at different times.

For example, when a relatively narrow range is specified as shown in a range S1 of FIG. 40, evaluation of roundness can be increased. In the case of having a potential intention to want to increase the evaluation, a narrow range may be specified even in an unintentional case. However, of course, in the case of making rigorous and correct evaluation, a properly sufficiently wide range should be specified as shown in a range S2. On the other hand, the edge portion naturally has deformation such as shear drops or burrs, so that when too wide a range S3 is specified, there is fear that a circular arc cannot be applied well. Thus, an evaluation result may greatly differ depending on only a small difference in specification of the evaluation range.

SUMMARY

An object of the invention is to provide a shape analysis method and a shape analysis program capable of improving operability and stabilizing evaluation by automating or semi-automating specification of an evaluation range in the case of analyzing shape measured data.

A shape analysis method of the invention is a shape analysis method for analyzing shape data acquired by measuring a contour shape of a workpiece to be measured, including: deciding a geometric element used in shape analysis; deciding one data point to be included in an evaluation range; applying the geometric element to an interval including the one data point; searching the widest interval for satisfying a threshold condition of a preset shape tolerance while changing a width of the interval; pinpointing two boundary points between which the interval found by the search is sandwiched, obtaining two edge points at which the two boundary points are respectively shifted by preset shift amounts; setting a range sandwiched between the edge points in the evaluation range; and targeting the shape data within the evaluation range for calculation of geometric properties.

In the invention, preferably, a geometric element, used in shape analysis, is a circle or a line; a roundness threshold is set for the circle as the shape tolerance; and a straightness threshold is set for the line as the shape tolerance.

In the invention, preferably, a user touches one point of shape data displayed on a touch panel display part and thereby one data point to be included in the evaluation range is specified.

In the invention, preferably, the evaluation range is any one selected from among an x-direction range having a width in an x direction, a z-direction range having a width in a z direction, a rectangular range having widths in the x direction and the z direction, and a data string direction range having a width along an arrangement direction of a data string, and selected priority is preset by a user.

In the invention, preferably, the shift amount is set as a length dimension or a ratio of the interval to length.

A shape analysis method of the invention is a shape analysis method for analyzing shape data acquired by measuring a contour shape of a workpiece to be measured, and in the case of obtaining a peak point or a bottom point within an evaluation range, the shape analysis method including: deciding one data point to be included in the evaluation range; calculating a differential coefficient at each point for an interval including the one data point; searching an interval sandwiched between inflection points while changing a width of the interval; pinpointing two boundary points between which the interval found by the search is sandwiched; obtaining two edge points at which the two boundary points are respectively shifted by preset shift amounts; setting a range sandwiched between the edge points in the evaluation range; and targeting the shape data within the evaluation range and calculating the peak point or the bottom point.

A shape analysis program of the invention is characterized by making a computer execute the shape analysis method described above.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 12 is a diagram showing one example of a display screen for setting priority of an evaluation range every geometric element;

FIG. 13 is a diagram showing one example in a display screen for setting a shift amount;

FIG. 14 is a diagram showing a list of properties targeted for evaluation;

DETAILED DESCRIPTION OF THE INVENTION

An embodiment of the invention will hereinafter be described with reference to the drawings.

First Embodiment

The case of applying the invention to a contour shape measuring apparatus will be described by way of example.

Figure 1:
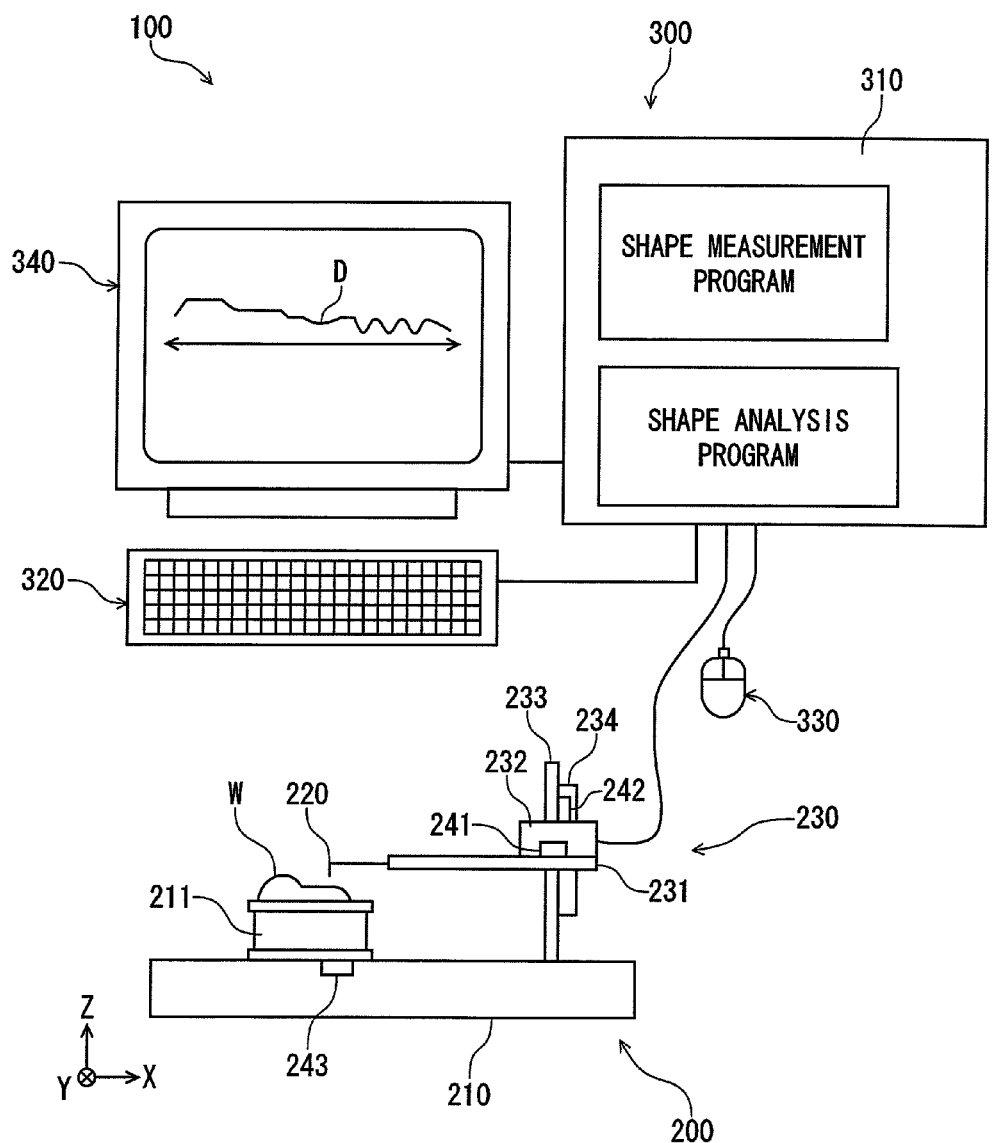
FIG. 1 is a diagram showing the whole configuration of a shape measuring system 100.

FIG. 1 is a diagram showing the whole configuration of a shape measuring system 100.

The shape measuring system 100 includes a shape measuring machine 200, and a computer system 300 for controlling this shape measuring machine 200.

A configuration of the shape measuring machine 200 is known, and will be described briefly.

The shape measuring machine 200 includes a table 210 on which work W is placed, a probe 220 for scanning a surface of the work placed on the table 210, a driving mechanism part 230 for moving the probe 220 with the probe 220 brought into contact with the work W, and sensors (241, 242, 243) for detecting a position of the probe 220.

On the table 210, the work W is placed on a placement stand 211, and this placement stand 211 is further placed on the table 210.

The driving mechanism part 230 includes a probe holding part 231 for holding the probe 220 substantially horizontally, a horizontal feeding driving part 232 for feeding the probe holding part 231 in substantially a horizontal direction, a vertical column 233 erected on the table 210, and a vertical feeding driving part 234 for moving the probe holding part 231 and the horizontal feeding driving part 232 along the vertical column 233. Consequently, the probe 220 can be moved in the horizontal direction and the vertical direction.

The computer system 300 drives and controls the horizontal feeding driving part 232 and the vertical feeding driving part 234 so that the probe 220 scans the work surface in contact with the work surface.

The sensors 241, 242, 243 are formed so as to detect a horizontal position (241) of the probe 220, a vertical position (242) of the probe 220 and a position (243) of the placement stand 211. Contour shape data of the work W can be acquired by acquiring sensor values at the time when the probe 220 makes contact with the work W.

The computer system 300 includes a host computer 310, a keyboard 320, a mouse 330, and a touch panel display 340. The keyboard 320 and the mouse 330 are naturally used as input devices. Further in the present embodiment, the touch panel display 340 functions as an input device. Also, the touch panel display 340 is an output device as a display device.

The host computer 310 has a CPU, ROM and RAM, and implements various functions by executing various programs. The programs include, for example, a shape measurement program and a data analysis program.

The shape measurement program is a program for acquiring shape data of work by driving and controlling a shape measuring machine. Since such many control programs are filed and disclosed by the present applicant, description herein is omitted.

The data analysis program is a program for analyzing shape data acquired and calculating geometric properties. The embodiment is characterized by the data analysis program, and is concretely characterized by a user interface for specifying an evaluation range in which the shape is analyzed.

Outline of Embodiment

An outline of the embodiment will be described before detailed description using a functional block diagram or a flowchart.

The functional block diagram or the flowchart will be described below after the outline description. This is because previous understanding of the outline probably facilitates understanding of a meaning of the invention.

The embodiment is characterized by a shape analysis program.

Particularly, an evaluation range is generated semi-automatically. Typically, a user automatically generates an evaluation range to calculate geometric properties by only one click (or one tap) on a screen. Hence, shape analysis operation by the embodiment is called one-click operation. As geometric elements used in shape analysis, a circle, a line and a point are typically given.

An outline of a method for executing shape analysis using the circle, the line and the point with one click will be described sequentially.

In addition, in general terms, selection operation performed using a pointing device such as a mouse is called a "click" and selection operation performed by touching a touch panel with a finger is called a "tap", but both of the selection operations do not differ substantially in one selection operation using a GUI. In the present specification, both are called the "click". Consequently, description of "click" does not exclude touch operation using the touch panel. Further, the "click" naturally includes selection operation equivalent to the click by a shortcut key using a keyboard.

Case where Evaluation Target is Part of Circle

Figure 2:
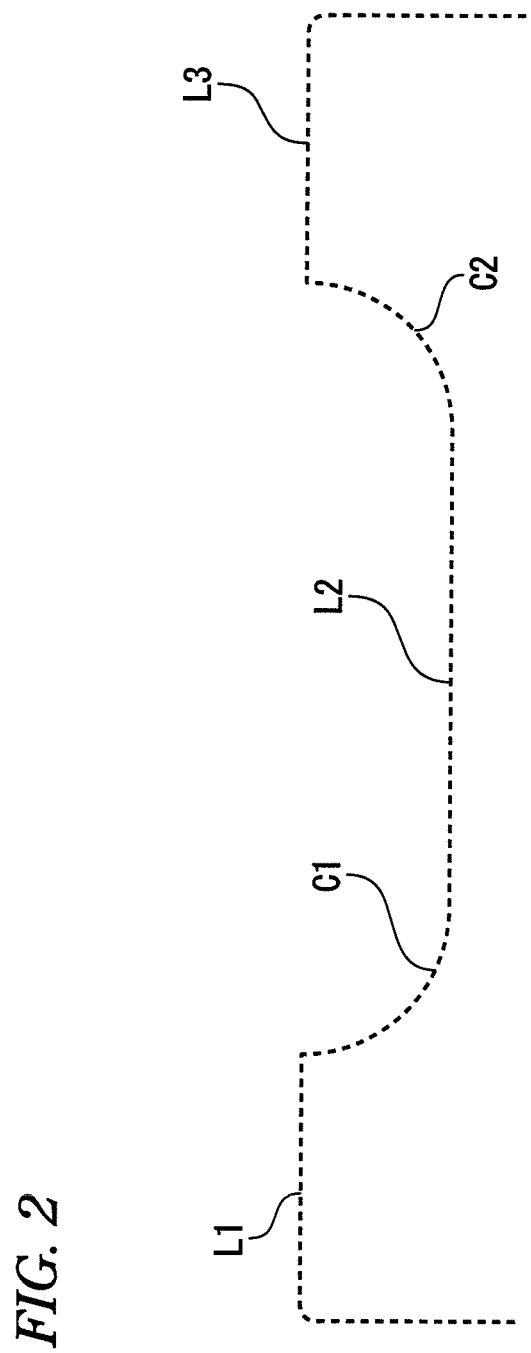
FIG. 2 is a diagram showing one example of measured data targeted for evaluation.

The case where an evaluation target is a part of a circle (that is, a circular arc) and a shape is evaluated using the circle as a geometric element will be described. Measured data targeted for evaluation is shown in FIG. 2. That is, a horizontal linear line portion L1 is present from the left end, and a downwardly convex circular arc portion C2 continuous with the line portion L1 is present. A central angle of the circular arc C2 is about 90°. Then, a linear line portion L2 continuous with the circular arc portion C2 is present.

The linear line portion L2 is present in a position lower by one stage with respect to the linear line portion L1. A downwardly convex circular arc portion C3 continuous with the line portion L2 is present. A central angle of the circular arc C3 is about 90°. Then, a linear line portion L3 continuous with the circular arc portion C3 is present. The linear line portion L3 is present in a position higher by one stage with respect to the linear line portion L2, and is positioned in about the same height as the linear line portion L1. It is assumed that roundness of the circular arc C2 wants to be evaluated in the case of obtaining such a data string.

Figure 3:
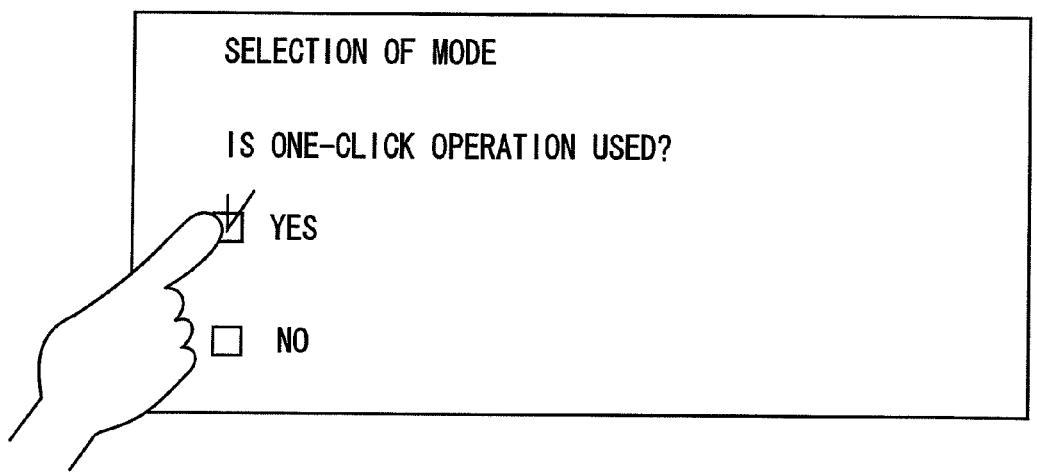
FIG. 3 is a diagram showing one example of a mode selection screen.

When a computer is instructed to execute a shape analysis, a mode selection screen is presented on a display screen as shown in FIG. 3. The mode selection screen asks whether one-click operation is used. In the case of selecting use of the one-click operation (click of "yes"), the screen then proceeds to a selection screen (FIG. 4) of an evaluation target.

The selection screen (FIG. 4) of the evaluation target asks what the evaluation target is. Here, a "circle" of (3) is selected. This means that roundness of the measured data is selected as the evaluation target.

Since the evaluation target is set in the circle (roundness), it is then necessary to select which roundness in the measured data is analyzed. The operation of a user is to click the vicinity of a region of data to be evaluated.

Figure 5:
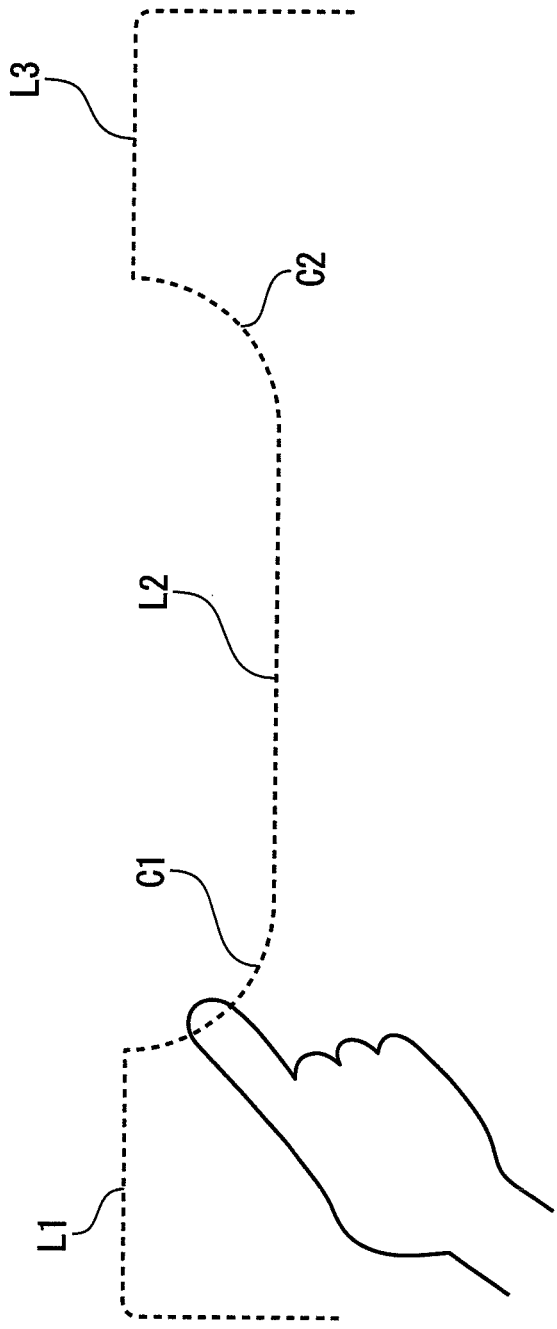
FIG. 5 is a diagram showing one example of a screen for selecting one measured data targeted for evaluation.

The measured data string is again shown in FIG. 5. The data string to be evaluated is a circular arc region C1 herein. The user clicks so as to select the circular arc portion C1.

At this time, data on the circular arc portion C1 may be clicked. FIG. 5 shows a situation in which data on the circular arc portion C1 is clicked. Or, the vicinity of the circular arc region C1 may be clicked without clicking the data itself on the circular arc region C1. The computer recognizes a data point nearest to clicked coordinates as a selected point (selection point) when data is not present at the clicked coordinates.

Figure 6:
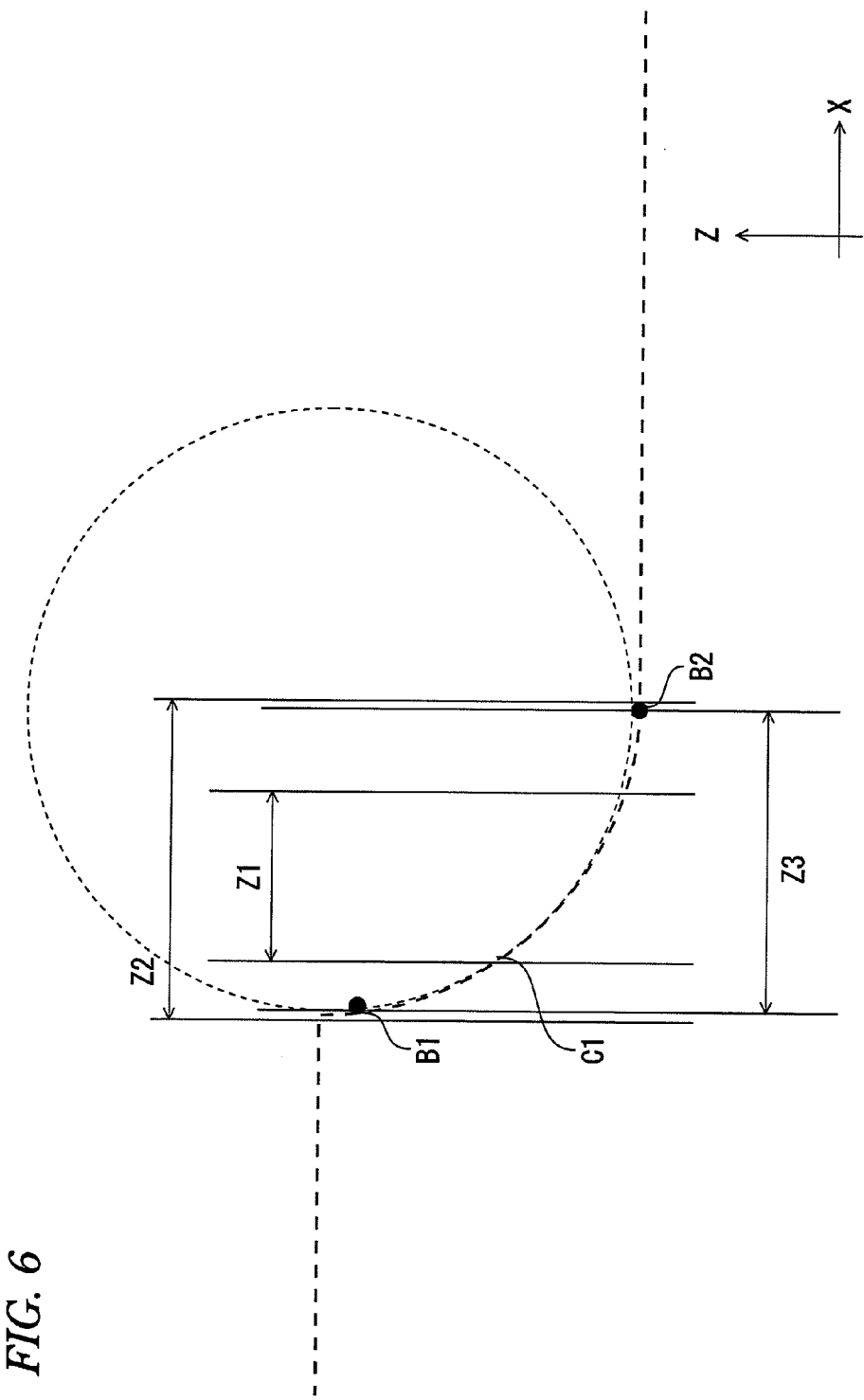
FIG. 6 is a diagram showing intervals with different widths for applying a circle.

The computer applies the circle to the data string including the selected data point. At this time, an interval for tracing a data point string from a selected data point P and applying the circle is gradually increased as shown in FIG. 6. When the circle is applied using a data point included in the circular arc portion C1 as a target as shown by an interval Z1, the data string takes on substantially a perfect circle. Consequently, the roundness at this time becomes a small value.

On the other hand, when the interval is set too widely and the circle is applied to a wide range of data points as shown by an interval Z2, the roundness becomes large. This is because the circle is applied to data of the straight line portions L1, L2 as well as data of the circular arc portion C1.

That is, the different intervals for applying the circle cause a difference in roundness calculated. Hence, the user presets a roundness threshold. Then, the computer is made to search the widest interval within the roundness threshold. Then, a range barely including the circular arc portion C1 as shown by an interval Z3 of FIG. 6 is obtained. When the interval Z3 is obtained, the computer is further made to pinpoint boundary points S1, B2 of this interval Z3.

In addition, in the case of defining the interval, there is a z-direction interval having a width in a z-axis direction as well as an x-direction interval having a width in an x-axis direction as shown in FIG. 6. Further, a rectangular range can be defined by the width in the x-axis direction and the width in the z-axis direction. Or, a range can be defined by a length along a direction of the data string regardless of the x-axis or the z-axis. This will be described below.

When the boundary points B1, B2 of the interval Z3 are pinpointed as shown in FIG. 6, the computer automatically calculates edge points E1, E2 shifted from the boundary points B1, B2 by predetermined shift amounts S.

Figure 7:
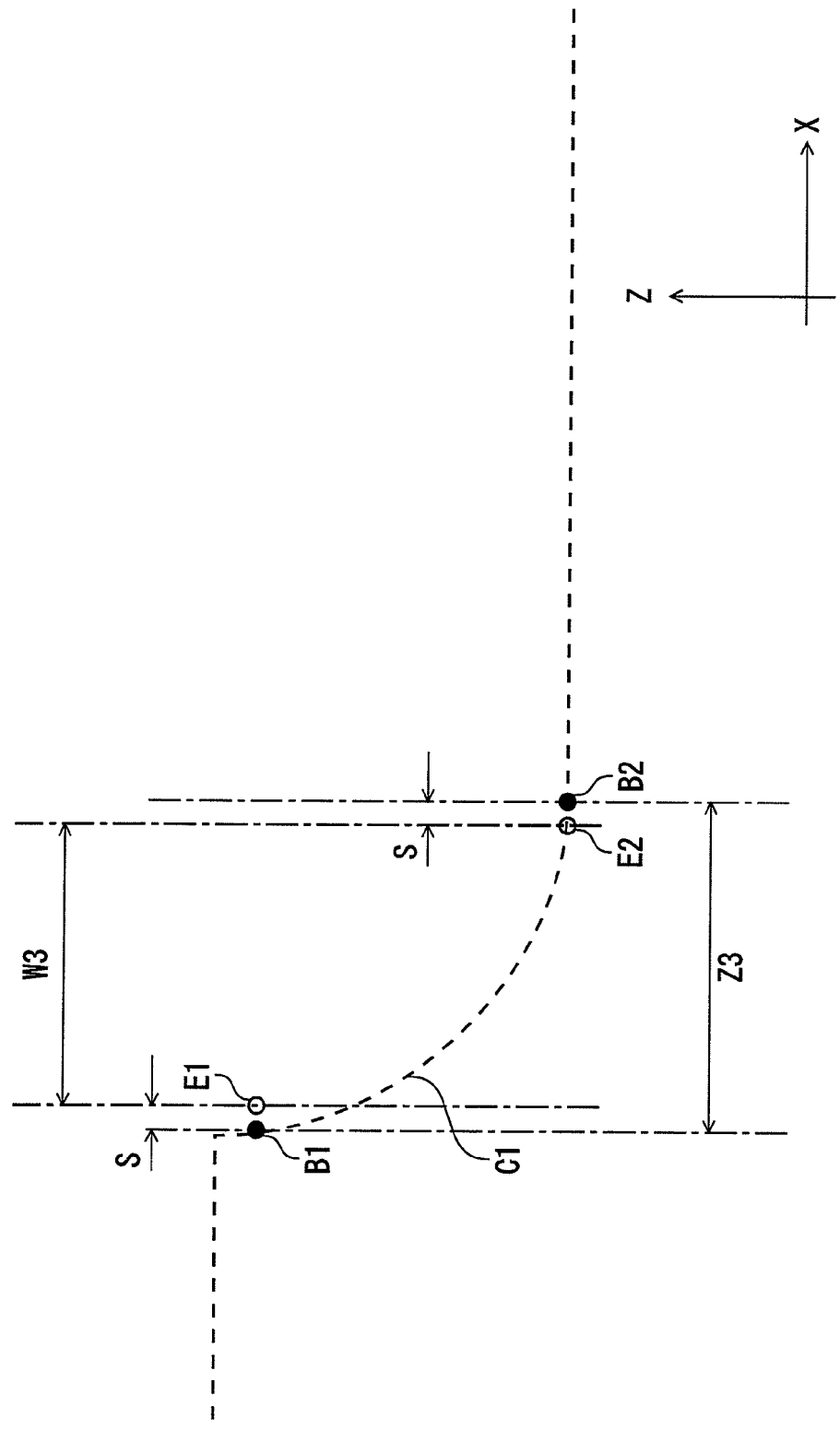
FIG. 7 is a diagram showing one example of an evaluation range.

In the current example, an evaluation range wants to be defined in the width in the x-axis direction, so that the boundary points B1, B2 are shifted along the x-axis direction. Further, the measured data wants to be evaluated by the "circle", so that the width must be narrowed than the interval Z3 (when the width is widened than the interval Z3, roundness naturally becomes larger than the roundness threshold). Consequently, the boundary points B1, B2 are shifted in an inside direction of the interval Z3 along the x-axis direction. Then, a range W3 suitable to evaluate the circular arc portion C1 is obtained as shown in FIG. 7.

When the range W3 is obtained, the computer subsequently automatically applies the circle to a data string included in the range W3 to obtain roundness.

The obtained roundness is displayed on the screen as an evaluated value.

Thus, the user single-clicks data (data of the circular arc portion C1) to be evaluated on the screen (FIG. 5). Then, the computer automatically calculates the evaluation range W3 using a preset value (threshold or shift amount). Further, the computer applies the circle to data of the evaluation range W3 to calculate the evaluated value (roundness). Accordingly, it is found that it becomes remarkably easy and simple for the user to operate.

Also, since the computer automatically calculates the evaluation range Wx using the preset value (threshold or shift amount), whoever performs operation anytime, the evaluation range W3 is generated by the same criterion and always has equivalent suitability. That is, the evaluation range is not too wide or narrow, and a suitable evaluated value can always be obtained in a suitable evaluation range.

Configuration

Since the outline of the embodiment is probably understood by the description herein, a concrete configuration of implementing the embodiment will be described.

Figure 8:
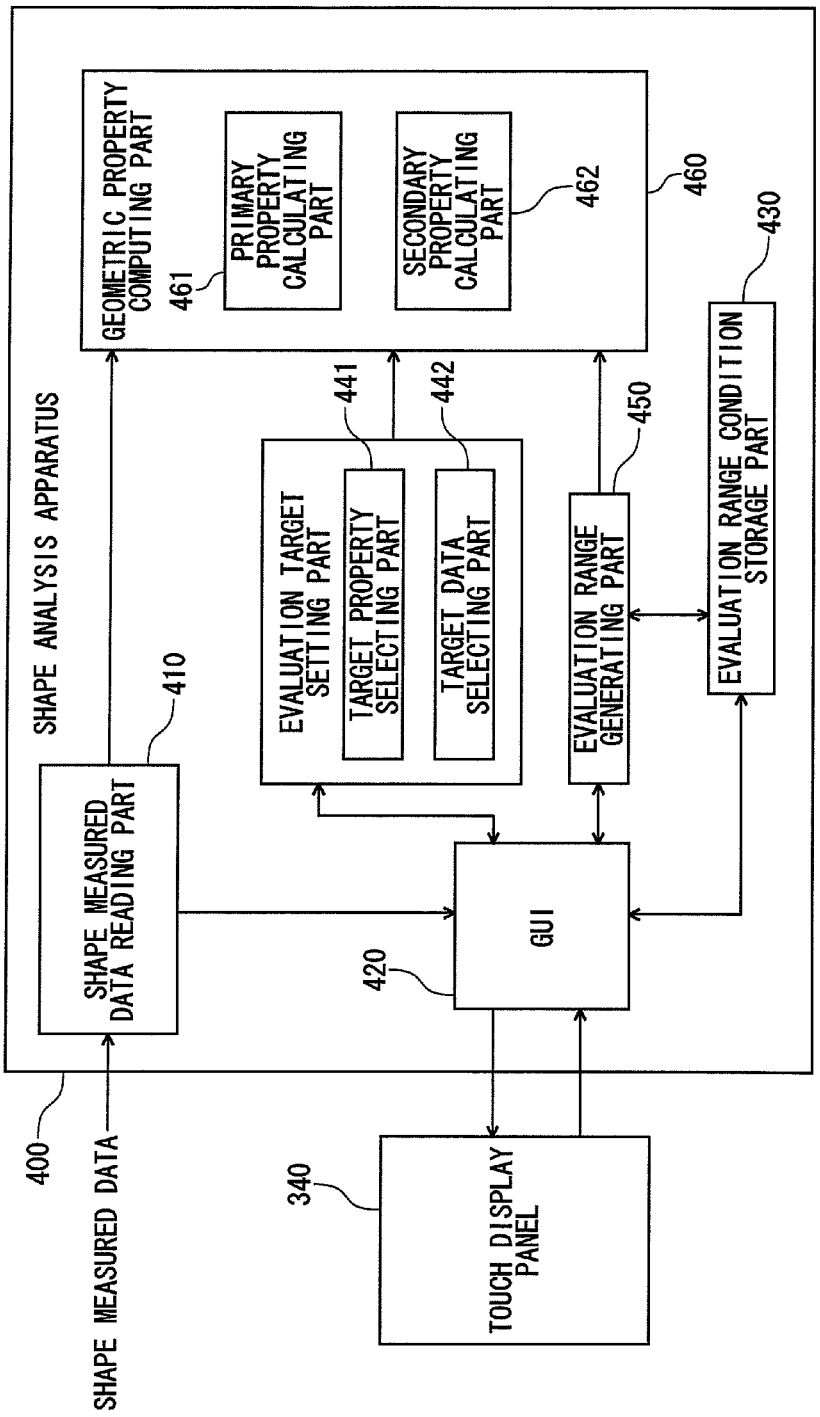
FIG. 8 is a functional block diagram of a shape analysis apparatus.

FIG. 8 shows a functional block diagram implementing the embodiment. That is, FIG. 8 is the functional block diagram representing a functional configuration implemented by a shape analysis program.

A shape analysis apparatus 400 shown in FIG. 8 is implemented by the shape analysis program by the embodiment.

The shape analysis apparatus 400 includes a shape measured data reading part 410, a GUI part (graphical user interface) 420, an evaluation range condition storage part 430, an evaluation target setting part 440, an evaluation range generating part 450, and a geometric property computing part 460.

The shape measured data reading part 410 reads contour shape data of work W obtained by the shape measuring machine 200.

The GUI part 420 is means for controlling input and output of the touch display panel 340. The GUI part 420 naturally displays data and further generates a GUI screen for prompting a user to operate selection based on a command from each functional part and displays the GUI screen on the touch panel 340. Also, the GUI part 420 detects input operation of the user using the touch panel 340, and outputs the contents of operation to each functional part.

The evaluation range condition storage part 430 stores conditions necessary to automatically generate an evaluation range.

Figure 9:
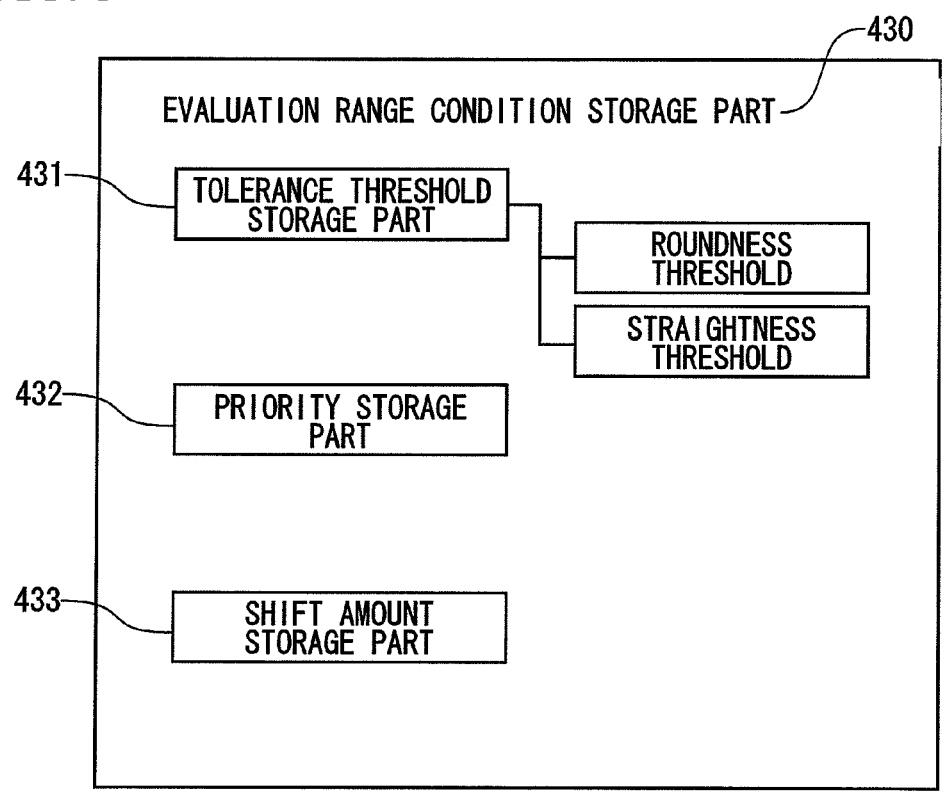
FIG. 9 is a diagram showing a configuration of an evaluation range condition storage part.

In order to execute shape analysis of data by one-click operation, it is necessary for the user to set various conditions before the shape analysis The evaluation range condition storage part 430 includes a tolerance threshold storage part 431, a priority storage part 432, and a shift amount storage part 433 as shown in FIG. 9.

The tolerance threshold storage part 431 stores a tolerance threshold preset by the user.

The tolerance threshold is a threshold necessary to calculate the boundary point described above. When a geometric element is a circle, the tolerance threshold indicates, that is, a roundness threshold. Also, when the geometric element is a line, the tolerance threshold indicates, that is, straightness.

Figure 10:
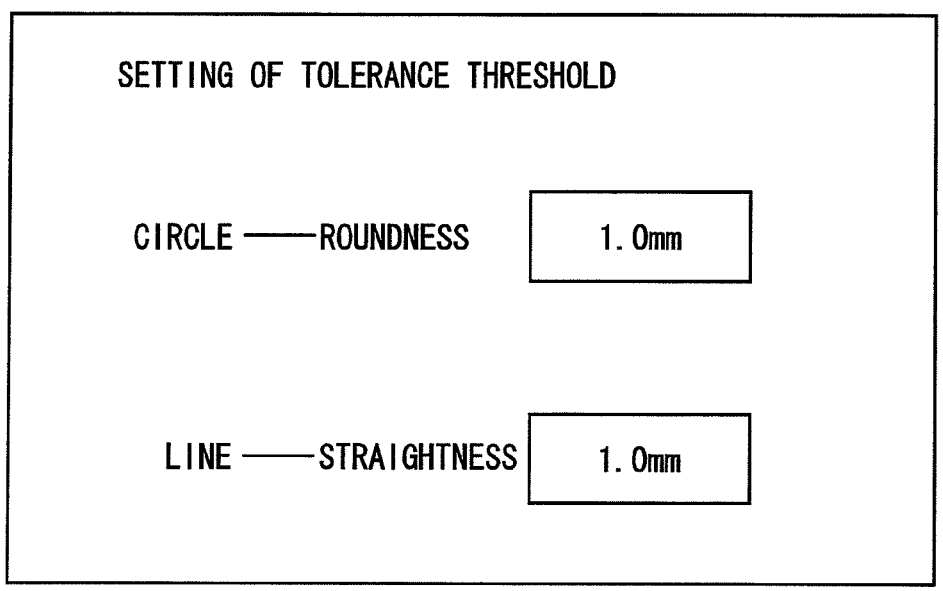
FIG. 10 is a diagram showing one example of a setting screen of a tolerance threshold.

FIG. 10 shows one example of a setting screen of the tolerance threshold. Here, both of the roundness threshold and the straightness threshold are set at 1.0 mm.

The priority storage part 432 stores which evaluation range is used on a priority basis. The evaluation ranges include a z-direction range, a rectangular range and a data string direction range in addition to the x-direction range described above. The user previously decides which evaluation range is used, and sets and registers the evaluation range. At this time, the evaluation range to be used according to a geometric element may differ, so that it could be constructed so as to be able to set which evaluation range is used every geometric element.

Figure 11:
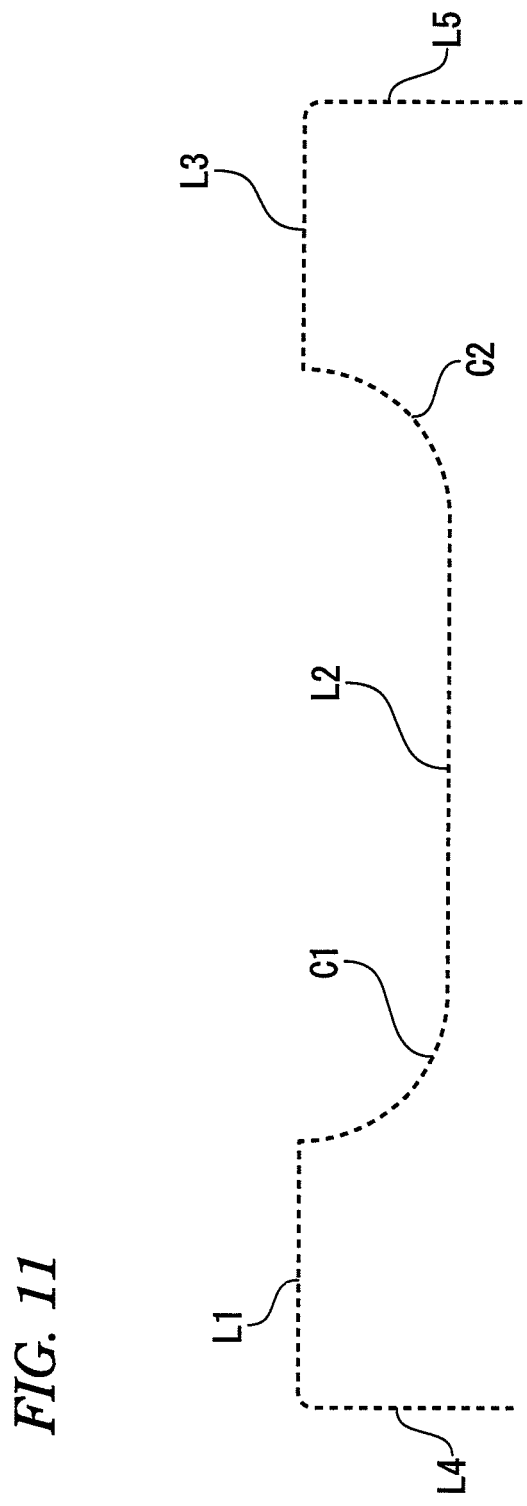
FIG. 11 is a diagram showing one example of measured data targeted for evaluation.

Also, the user wants to the x-direction range mainly, but it is possible that the x-direction range cannot be generated depending on an evaluation target. In such a case, priorities are assigned to the evaluation range and when the evaluation range with the first priority cannot be used, the evaluation range with the second priority could be set so as to be used automatically. For example, in FIG. 11, when line portions L1, L2, L3 are targeted for evaluation, the line extends in an x direction, so that it is suitable to use the evaluation range having a width in the x direction. However, when a portion having a length in a z direction as shown by a line portion L4 or a line portion L5 is targeted for evaluation, it is not suitable to generate the evaluation range having the width in the x direction.

When the x-direction range attempts to be generated with respect to the line portion L4 or the line portion L5, an error occurs and in some cases, operation of the program may stop. Hence, the x-direction range is generated as the first priority, but when the x-direction range cannot be generated, the evaluation range with the second priority is constructed so as to be generated. FIG. 12 is one example of a display screen for setting priorities of the evaluation range used every geometric element.

The shift amount storage part 433 stores a shift amount preset by the user. The shift amount is required in order to calculate an edge point of the evaluation range from the boundary point after the boundary point is obtained as described above. The shift amount is preferably constructed so as to set a value suitable every geometric element and set a value suitable every direction.

FIG. 13 is one example in a display screen for setting the shift amounts. Here, all the shift amounts are set at 1.0 mm.

Next, the evaluation target setting part 440 makes a user select and set an evaluation target.

The evaluation target setting part 440 includes a target property selecting part 441, and a target data selecting part 442.

The target property selecting part 441 makes the user select and set properties targeted for evaluation.

Figure 4:
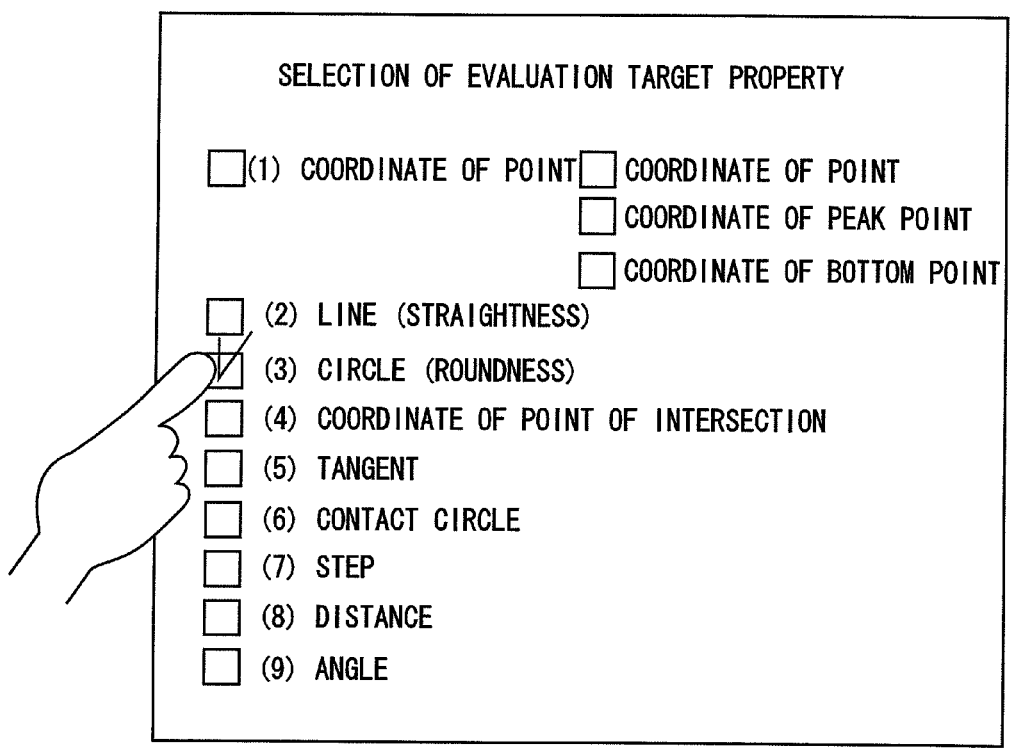
FIG. 4 is a diagram showing one example of a screen for selecting an evaluation target.

As the properties targeted for evaluation, the properties shown in FIG. 4 are given, and the properties are again shown in FIG. 14.

First, as primary properties, (1) coordinates of a point, (2) a line (straightness) and (3) a circle (roundness) are given.

In addition, calculation of "(1) coordinates of a point" includes calculation of a peak point or a bottom point in addition to the case of obtaining a coordinate value of the point nearest to a place specified by the user.

Also, as secondary properties, (4) coordinates of a point of intersection, (5) a tangent, (6) a contact circle, (7) a step, (8) a distance and (9) an angle are given.

When the evaluation target properties are the primary properties herein, an element (point, line or circle) used in evaluation is only one.

On the other hand, when the evaluation target properties are the secondary properties, two elements used in evaluation are required. Consequently, when the evaluation target properties are the secondary properties, the user must be made to select the two elements.

A function of the target data selecting part 442 makes the user select data targeted for evaluation, and an example of a concrete selection screen will be described in a concrete example described below.

The evaluation range generating part 450 generates an evaluation range. The evaluation range generating part 450 automatically generates the evaluation range while referring to each condition stored in the evaluation range condition storage part 430 according to an evaluation target selected by the user.

A step of generating the evaluation range is schematically described previously.

When the description is repeated briefly, the boundary points are calculated based on the tolerance threshold and further, the edge points shifted from the boundary points by the predetermined shift amounts are calculated. Then, the range sandwiched between the edge points becomes the evaluation range.

The details will be described in a concrete example.

The geometric property computing part 460 obtains evaluation target properties for the measured data within the evaluation range generated. A primary property computing part 461 takes charge of execution of computation when the evaluation target properties are the primary properties. A secondary property computing part 462 takes charge of execution of computation when the evaluation target properties are the secondary properties.

In consideration of ease of understanding of description, the primary property computing part 461 and the secondary property computing part 462 are divided as functional blocks, but there is no particular difference between both of the property computing parts in a computation function.

However, in the case of computing the secondary properties, computation becomes two stages, so that the number of man-hours of secondary property computation may become larger than that of primary property computation.

First Operation Example

A procedure of operation of the embodiment will be described.

The case of obtaining straightness of a line segment will be described as a first operation example.

Figure 15:
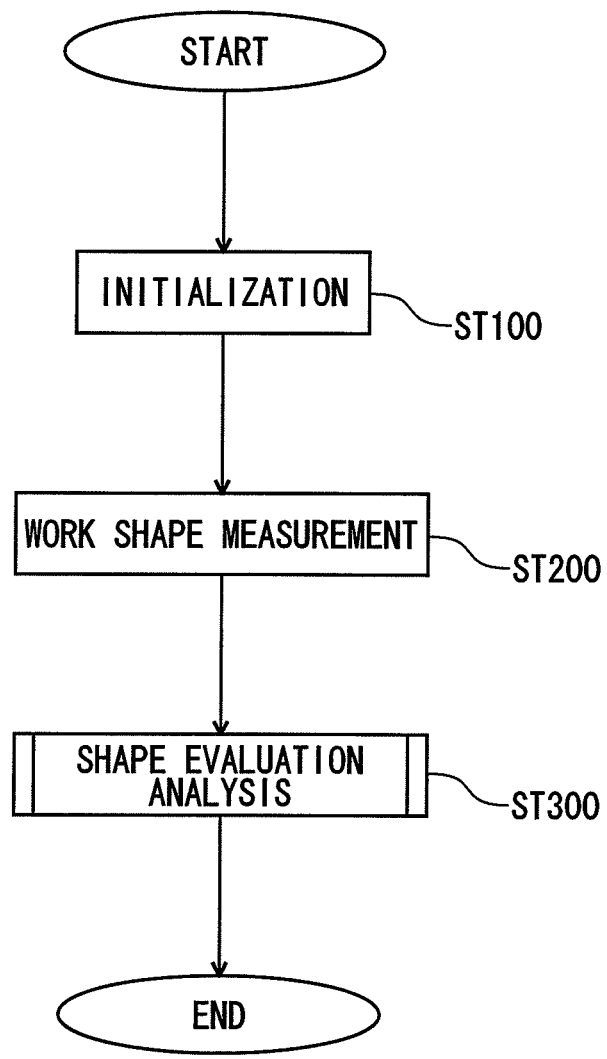
FIG. 15 is a flowchart showing the whole operation procedure of shape analysis.

The procedure of operation of the embodiment broadly includes initialization (ST100), work shape measurement (ST200), and shape evaluation analysis (ST300) as shown in a flowchart of FIG. 15.

In the initialization (ST100), conditions necessary for one-click operation are preset. The conditions include setting of a tolerance threshold (FIG. 10), priority of an evaluation range (FIG. 12) and setting of a shift amount (FIG. 13).

When the initialization (ST100) is completed, a shape of work W targeted for evaluation is measured. That is, contour shape data of the work W is acquired using the shape measuring machine shown in FIG. 1. The shape data is stored in memory (for example, nonvolatile memory) of the inside of the host computer 310.

In order to verify working accuracy of this work W after the contour shape data of the work W can be acquired, a user activates a shape analysis program and analyzes the shape of the work W.

Figure 16:
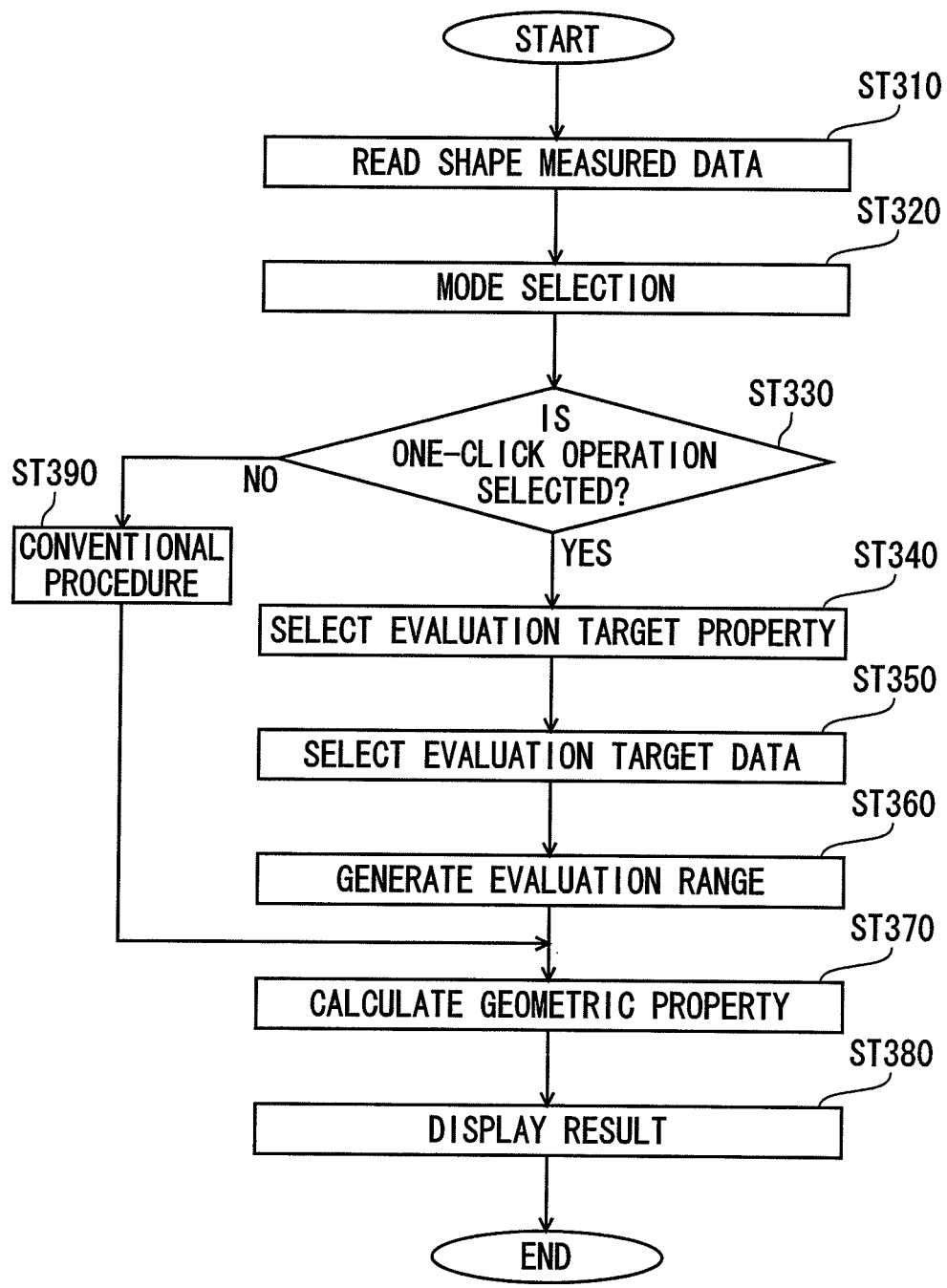
FIG. 16 is a flowchart showing an operation procedure of shape analysis.

A procedure of operation of shape analysis will be described with reference to a flowchart of FIG. 16.

When the shape analysis program is activated, the shape analysis apparatus 400 reads the acquired shape data by the shape measured data reading part 410 (ST310).

Here, the shape data of FIG. 2 is again taken as an example. Then, the user shall want to evaluate straightness of the line portion L2.

Next, the shape analysis apparatus 400 displays a selection screen (FIG. 3) of a mode on the touch panel 340, and prompts the user to make selection (ST320).

Here, the user selects one-click operation (ST330: YES).

Then, the user is prompted to select an evaluation target.

That is, the user is made to select evaluation target properties (ST340) and evaluation target data (ST350).

Figure 17:
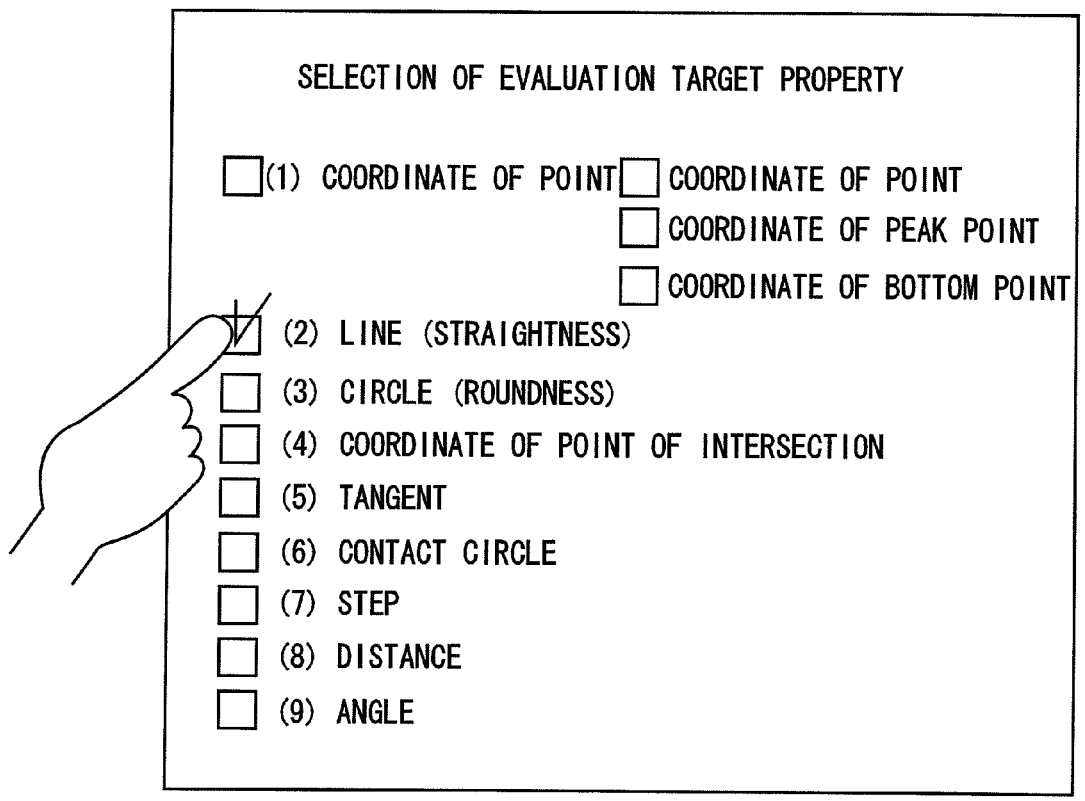
FIG. 17 is a diagram showing one example of a selection screen of the properties targeted for evaluation.

In ST340, the target property selecting part 441 indicates a selection screen of the evaluation target properties of FIG. 17 and prompts the user to select the evaluation target properties.

Here, the user selects (2) a line (straightness) in the selection screen of the evaluation target properties (FIG. 17).

Then, the target data selecting part 442 makes the user select data targeted for evaluation (ST350).

Here, the evaluation target properties are straightness of the "line". Consequently, the target data selecting part 442 prompts the user to select the line portion in the shape data.

Figure 18:
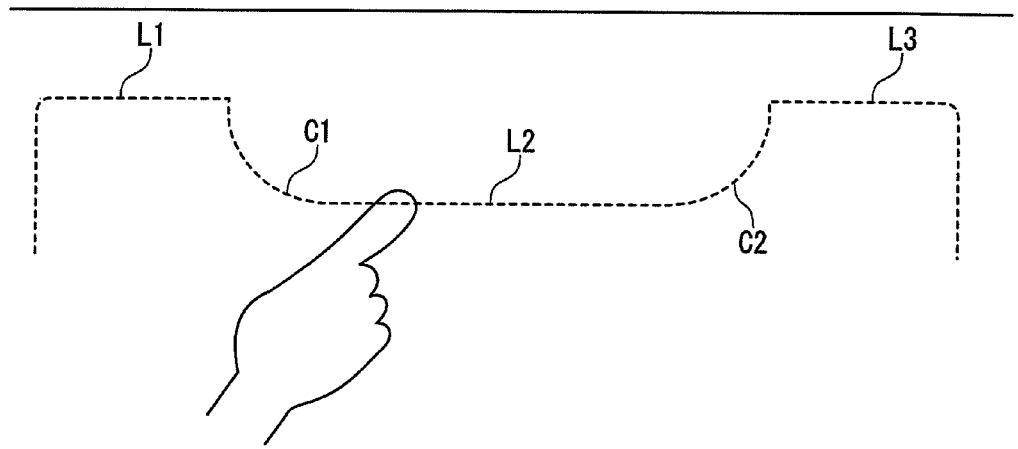
FIG. 18 is a diagram showing one example of a message screen for selecting a line segment.

For example, a message for selecting the line segment is displayed as shown in FIG. 18.

The user clicks data on the line segment L2 to be evaluated.

Now, the shape analysis apparatus 400 then automatically generates an evaluation range (ST360) since all the selection instructions by the user are completed. That is, the evaluation range generating part 450 gradually increases a range in which a data point string is traced from a clicked data point P2 and the line is applied. Here, straightness of the line as a tolerance threshold is set at 1.0 mm (FIG. 10).

Consequently, the evaluation range generating part 450 searches the widest range including the point P2 without exceeding a straightness threshold (1.0 mm).

Figure 19:
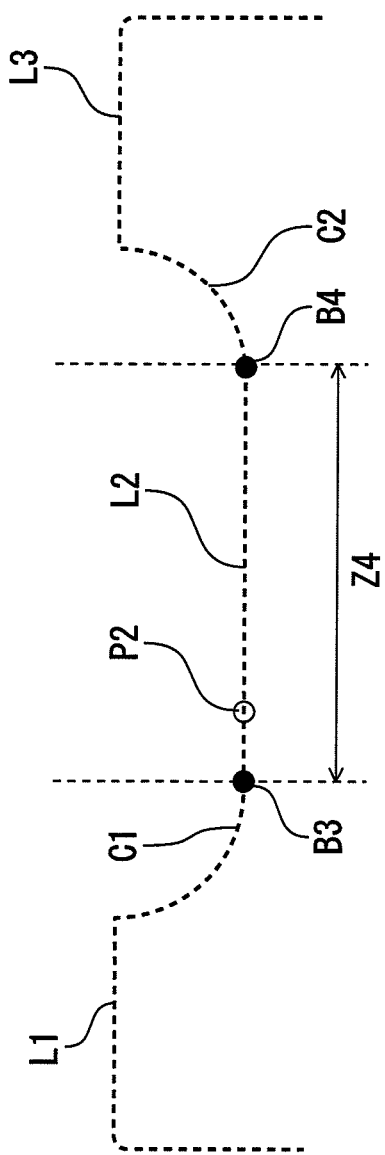
FIG. 19 is a diagram showing a state in which boundary points are calculated.

Then, a boundary point B3 between a circular arc portion C1 and the line segment L2 and a boundary point B4 between a circular arc portion C2 and the line segment L2 are obtained as shown in FIG. 19. That is, an interval Z4 sandwiched between the boundary point B3 and the boundary point B4 is obtained.

Figure 20:
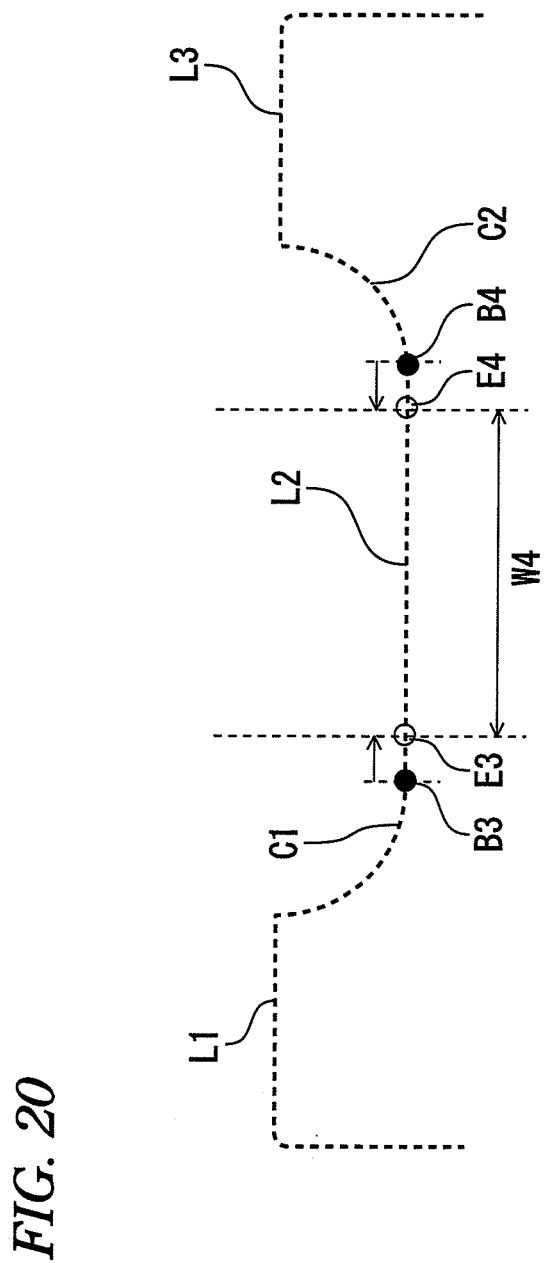
FIG. 20 is a diagram showing one example of an evaluation range obtained.

Then, in priority of the evaluation range, an "X-direction range" is specified as the first priority with respect to the line (FIG. 12). Consequently, the evaluation range generating part 450 shifts the boundary points B3, B4 by the amount specified along the x direction. As the shift amount, the shift amount in the X direction is set at 1.0 mm as shown in FIG. 13. Consequently, as shown in FIG. 20, the boundary point B3 and the boundary point B4 are shifted to the inside of the interval Z4 by 1.0 mm, and an edge point E3 and an edge point E4 are obtained. The range sandwiched between the edge point E3 and the edge point E4 is defined as an evaluation range W4 (ST360). The evaluation range generating part 450 outputs the evaluation range W4 obtained in this manner to the geometric property computing part 460.

After the evaluation range is defined, the geometric property computing part 460 applies the line to the data (line segment L2) in the evaluation range W4 and calculates the straightness (ST370). The obtained straightness is displayed on the touch panel 340 as an evaluated value (ST380).

Such an embodiment has the following effects.

(1) According to the embodiment, it becomes unnecessary for a user to specify an evaluation range point by point. Conventionally, even in the case of specifying an x-direction range, a left edge point and a right edge point must be instructed on a screen.

This has a problem that the number of operations is large and the operation varies depending on people. Also, the specification itself of the evaluation range is a concept difficult for a beginner to understand, and this makes it difficult to use the shape analysis program.

In this respect, in the embodiment, when conditions for generating the evaluation range are first decided, the user only selects an evaluation target and thereby, the evaluation range is automatically generated to calculate an evaluated value. Consequently, effects of extremely simplifying operation and also stabilizing evaluation always can be obtained.

(2) In the embodiment, touch operation by the touch panel is adopted, so that the operation is easier and more intuitive. Conventionally, when a user manually generates an evaluation range point by point, it becomes necessary to perform operation, for example, type numerical values at a keyboard etc. On the other hand, in the embodiment, the user has only to input one point of data targeted for evaluation and properties targeted for evaluation in the case of shape analysis.

That is, it is unnecessary to type the close numerical values point by point in the case of shape analysis. Thus, the number of inputs decreases and it becomes easy to do a selection input, so that simple input operation such as the touch operation can be adopted in the embodiment.

(3) Automatic generation of the evaluation range is constructed so that a boundary point is decided by a tolerance threshold and then the boundary point is further shifted by a predetermined shift amount and an edge point of the evaluation range is set.

By the boundary point, a boundary etc. between a line portion and a circular portion can be detected and a point transiting from the line to the circle can be found. However, only by the boundary point, the circular portion present in the outside of the line portion may be included in the interval. Consequently, by making the shift from the boundary point by the predetermined shift amount, a point of transition between the line portion and the circular portion is excluded and only the line portion can properly be set in the evaluation range targeted for evaluation.

Second Operation Example

Next, the case of obtaining a point of intersection between two line segments will be described as a second operation example.

Shape data is again taken as an example in FIG. 2. Then, a user shall want to evaluate coordinates of a point of intersection between a line segment L1 and a line segment L4.

Figure 21:
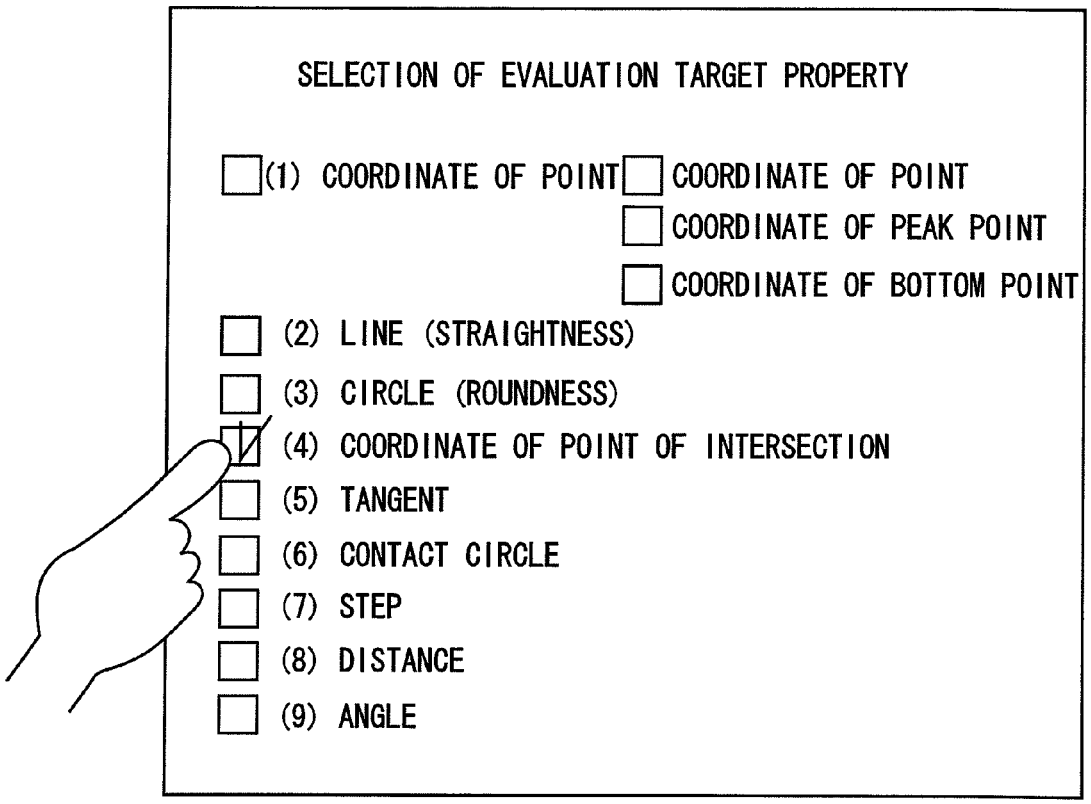
FIG. 21 is a diagram showing one example of a selection screen of the properties targeted for evaluation.

When the user selects one-click operation (ST330: YES), the target property selecting part 441 makes the user select properties targeted for evaluation (ST340). Here, the user selects "coordinates of a point of intersection" (see FIG. 21).

Next, the target data selecting part 442 makes the user select data targeted for evaluation (ST350). Here, the evaluation target properties are the "coordinates of the point of intersection".

The coordinates of the point of intersection are secondary properties, and two elements are required in order to obtain the point of intersection as shown in FIG. 14. Consequently, the target data selecting part 442 makes the user select the two elements in the shape data.

The point of intersection includes, for example, a point of intersection between lines or a point of intersection between a line and a circle, and there are several variations, for example, a point of intersection between any geometric element and any geometric element is obtained. Consequently, the target data selecting part 442 must make the user select a kind of geometric element.

Figure 22:
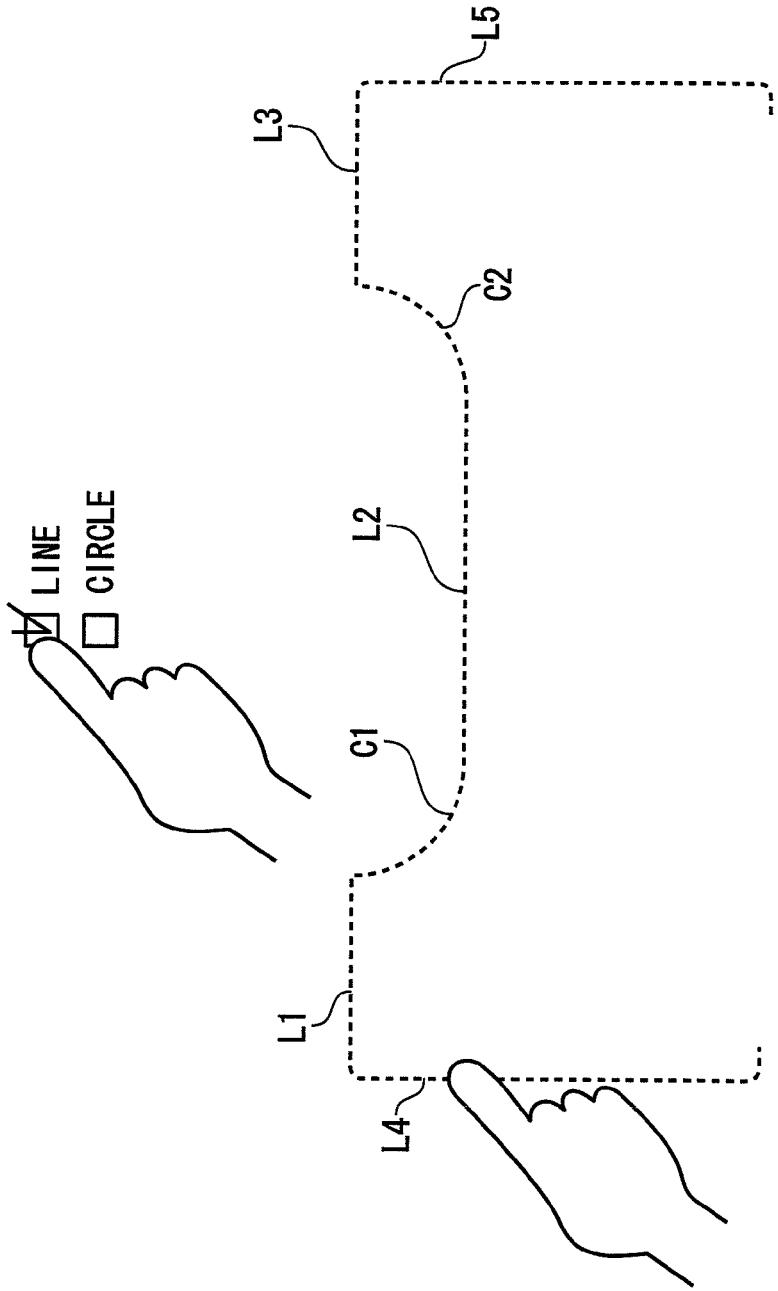
FIG. 22 is a diagram showing one example of a message screen for selecting a geometric element and measured data.
Figure 23:
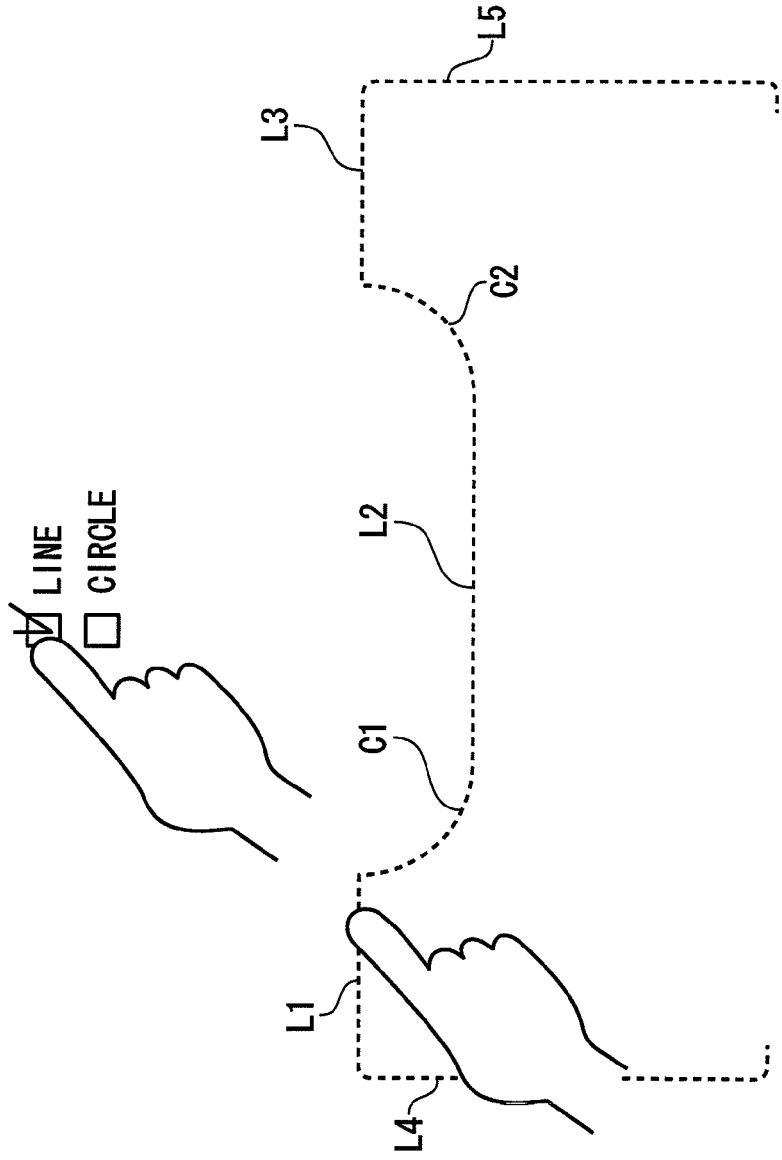
FIG. 23 is a diagram showing one example of a message screen for selecting a geometric element and measured data.

A concrete example of a screen is shown. As shown in FIG. 22, selection of a geometric element is also prompted, for example, "touch data subsequently to selection of geometric element". As the geometric element, a line segment and a circular arc may be given to a selection menu.

The user first selects a "line" as a kind of geometric element and subsequently clicks the line segment L4 which is data to be evaluated.

Since the properties targeted for evaluation are the "point of intersection", another element targeted for evaluation is required. Subsequently, the target data selecting part 442 prompts the user select data targeted for evaluation.

On the screen, the user selects a "line" as a kind of geometric element and subsequently clicks the line segment L1 which is data to be evaluated.

In this manner, selection of the data targeted for evaluation is determined.

Next, automatic generation of an evaluation range is executed by the evaluation range generating part 450 (ST360).

Figure 24:
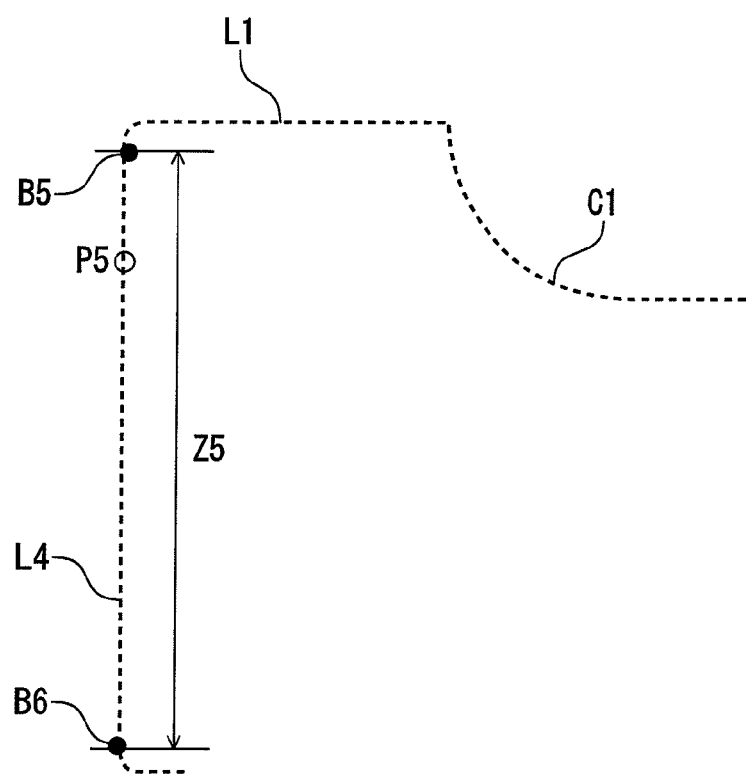
FIG. 24 is a diagram showing a state in which boundary points are calculated.

First, an evaluation range for the line segment L4 is generated. The widest range including a clicked point P5 without exceeding a straightness threshold is searched as shown in FIG. 24. Then, a boundary point B5 and a boundary point B6 are calculated as described above.

Here, priorities for creating the evaluation range are set as shown in FIG. 12.

In the case of evaluating a "line", the first priority is an x-direction range. Consequently, the boundary point B5 and the boundary point B6 want to be shifted in an x direction by a predetermined amount (1.0 mm). However, an interval Z5 sandwiched between the boundary point B5 and the boundary point B6 does not have a width in the x direction. Then, a command to shift the boundary point B5 and the boundary point B6 to the inside of the interval Z5 contradicts a command to shift the boundary point B5 and the boundary point B6 in the x direction by the predetermined amount (1.0 mm).

Figure 25:
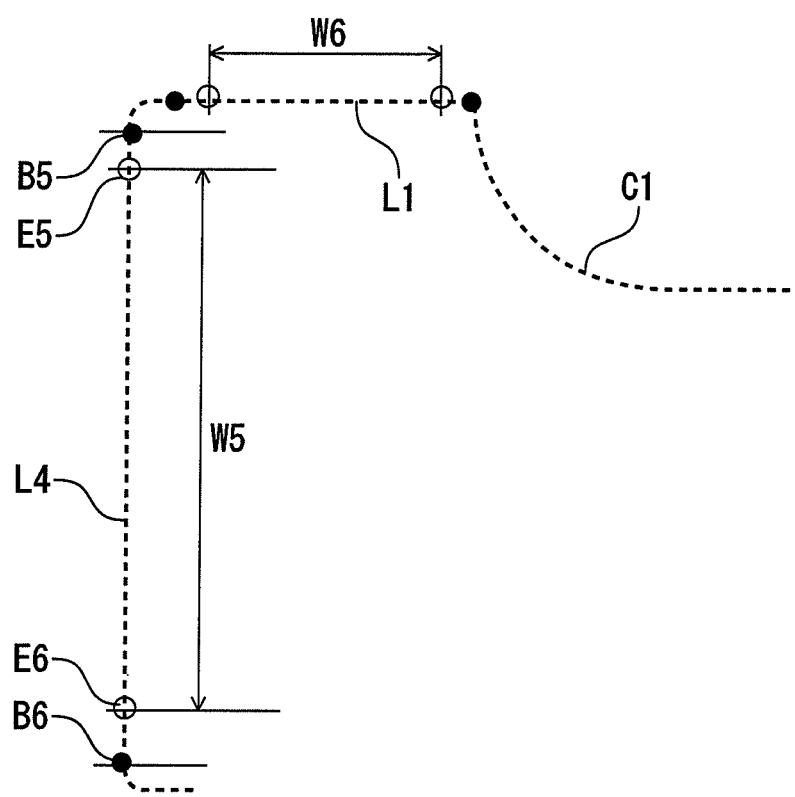
FIG. 25 is a diagram showing a state in which an evaluation range is generated.

When a contradiction arises in a step of creating the evaluation range thus, the evaluation range is switched to a z-direction range with the second priority. Then, the boundary point B5 and the boundary point B6 are shifted toward the inside of the interval Z5 by a predetermined amount (1.0 mm). Then, an evaluation range W5 having a width in a z direction is generated as shown in FIG. 25.

Further, the evaluation range generating part 450 generates an evaluation range W6 for evaluating the line segment L1.

A step of generating the evaluation range W6 is omitted since the step can be understood from the above description (for example, see a step of generating the evaluation range W4 (FIG. 20)).

Thus, the evaluation range W5 and the evaluation range W6 can be generated (ST360). Next, desired geometric properties are calculated using the evaluation range W5 and the evaluation range W6 (ST370). That is, a point of intersection between (extension of) the line segment L4 and (extension of) the line segment L1 is calculated.

Figure 26:
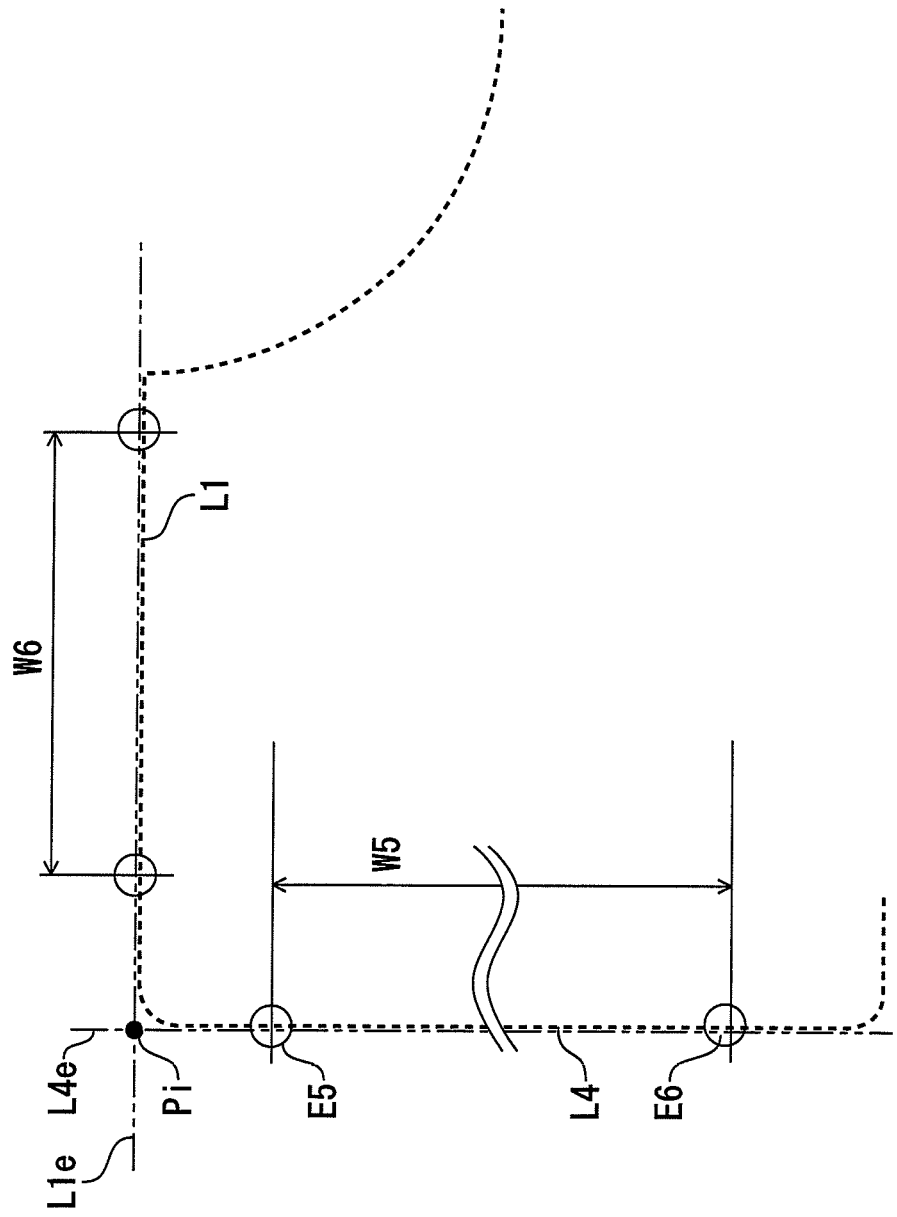
FIG. 26 is a diagram showing a situation in which coordinates of a point of intersection are obtained.

First, data points included in the evaluation range W5 are linearly regressed and a straight line L4e obtained from the evaluation range W5 is obtained (see FIG. 26). Similarly, data points included in the evaluation range W6 are linearly regressed and a straight line L1e obtained from the evaluation range W6 is obtained (see FIG. 26). Since the straight line L4e and the straight line L1e obtained in this manner are obtained from the proper evaluation ranges, it will be understood that a shape of work W is reflected properly. Then, a point Pi of intersection between the straight line L4e and the straight line L1e is obtained as desired coordinates of a point of intersection (ST370).

Coordinate values of the point Pi of intersection obtained as a result are displayed on the touch panel display part 340.

As the second operation example, the example of obtaining the point of intersection between the two line segments (straight lines) as the secondary properties is shown, but it will easily be understood that some modification of this example can simply be applied to the case of targeting other secondary properties for evaluation.

As shown in this operation example, the embodiment further has the following effects in addition to the above effects (1) to (3).

(4) In the embodiment, priorities of an evaluation range are predetermined (FIG. 12) and when a contradiction arises in a process of creating the evaluation range, the evaluation range with the second priority is automatically selected. Accordingly, for example, even when a contradiction arises in a process of creating an x-direction range, automatic generation of the evaluation range can be advanced by switching to a z-direction range having the second priority without an error stop. Accordingly, execution of the shape analysis program is not stopped naturally and a proper evaluation range is automatically selected according to an evaluation target. The embodiment leads to an improvement in shape analysis as compared with the case of again selecting a kind of evaluation range every time an error occurs.

(5) The case of obtaining secondary properties such as a point of intersection has a very great effect of reducing the number of operations.

In the case of attempting to obtain a point of intersection between two line segments by a conventional method, the following procedure is used. First, L4e is obtained and is once retained. Next, L1e is obtained and is once retained. Then, L4e and L1e are again called and a point of intersection between the two L4e and L1e is obtained.

As compared with such time and effort, the embodiment only touches a screen several times. By only touching the screen several times, proper evaluation ranges are automatically obtained for the respective line segments L4, L1 and the line segments L4e, L1e are further obtained and the point of intersection is further obtained. Particularly, it is unnecessary to sequentially consider or again set the z-direction range or the x-direction range every target line segment L4, L1, so that the embodiment leads to reduction in a load of operation.

Third Operation Example

Next, the case of obtaining a peak point as coordinate values of a point will be described as a third operation example.

Figure 27:
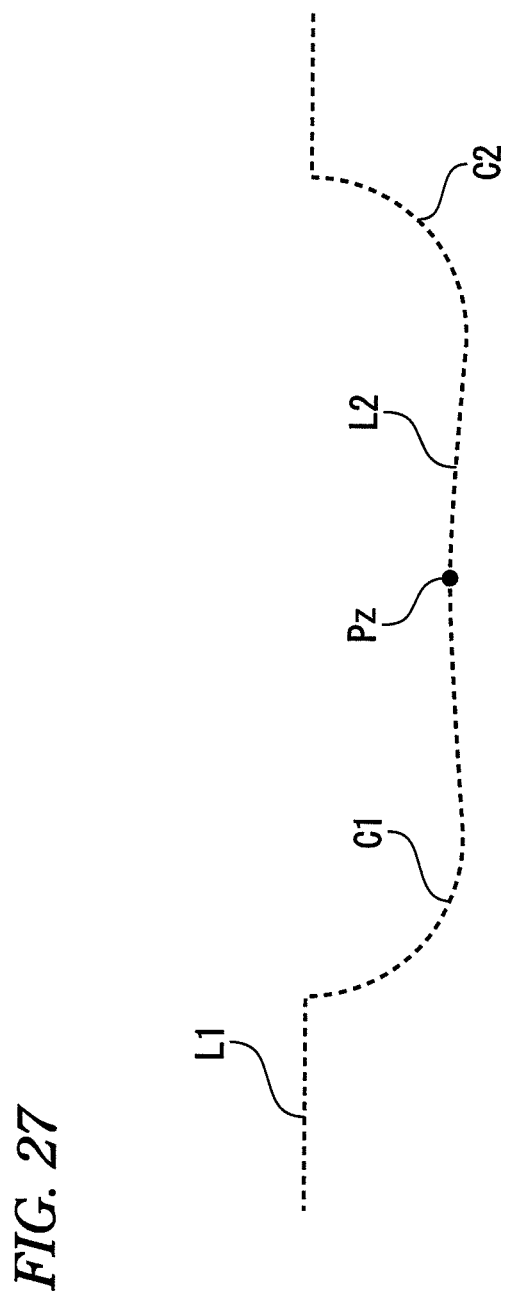
FIG. 27 is a diagram showing one example of measured data targeted for evaluation.

For example, it shall want to obtain a point with the highest z coordinate (peak point) in a data string corresponding to a line segment L2 in FIG. 27.

Here, as shown in FIG. 27, the line segment L2 should be worked as a straight line, but actual measured data shall show that the line segment L2 has an undulating shape in which the center swells slightly. Coordinate values of a point Pz with the highest undulation shall want to be obtained herein.

When a user selects one-click operation (ST330: YES), the target property selecting part 441 makes the user select properties targeted for evaluation (ST340).

Figure 28:
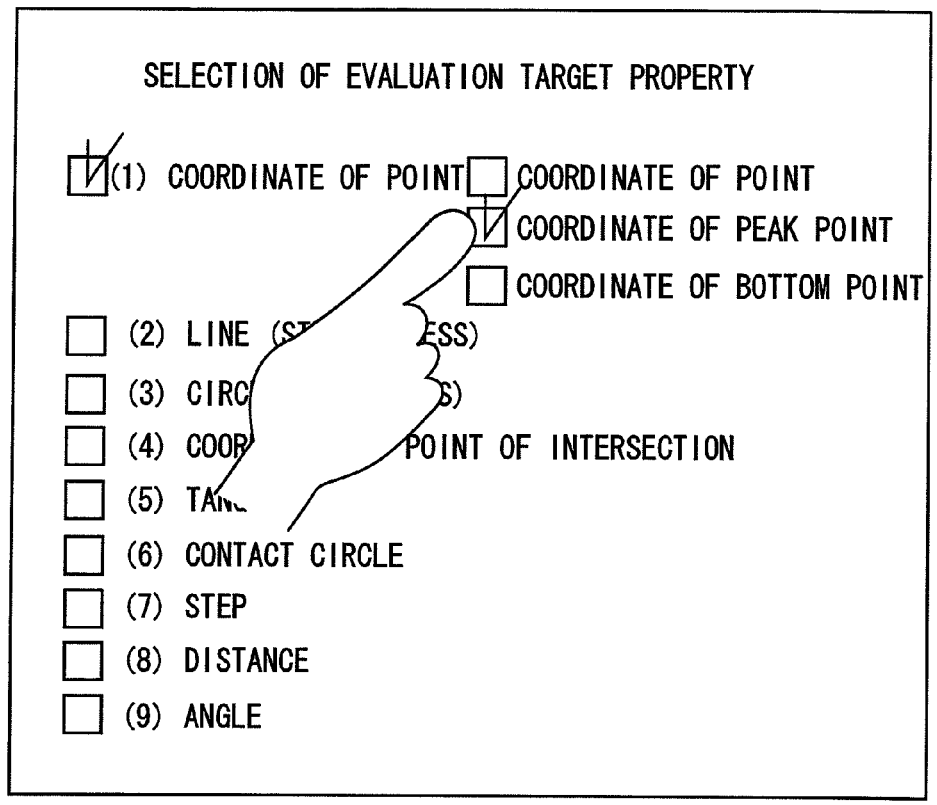
FIG. 28 is a diagram showing one example of a selection screen of the properties targeted for evaluation.

Here, the user selects "coordinates of a peak point" as the properties targeted for evaluation (see FIG. 28).

Next, the target data selecting part 442 makes the user select data targeted for evaluation (ST350).

Here, the properties targeted for evaluation are the "coordinates of the peak point".

The "coordinates of the peak point" are primary properties, and the user could be made to select one element in the case of obtaining the peak point as shown in FIG. 14.

The target data selecting part 442 instructs the user which peak point wants to be obtained in shape data. For example, a message to select a calculation range of the peak point is displayed as shown in FIG. 29.

Figure 29:
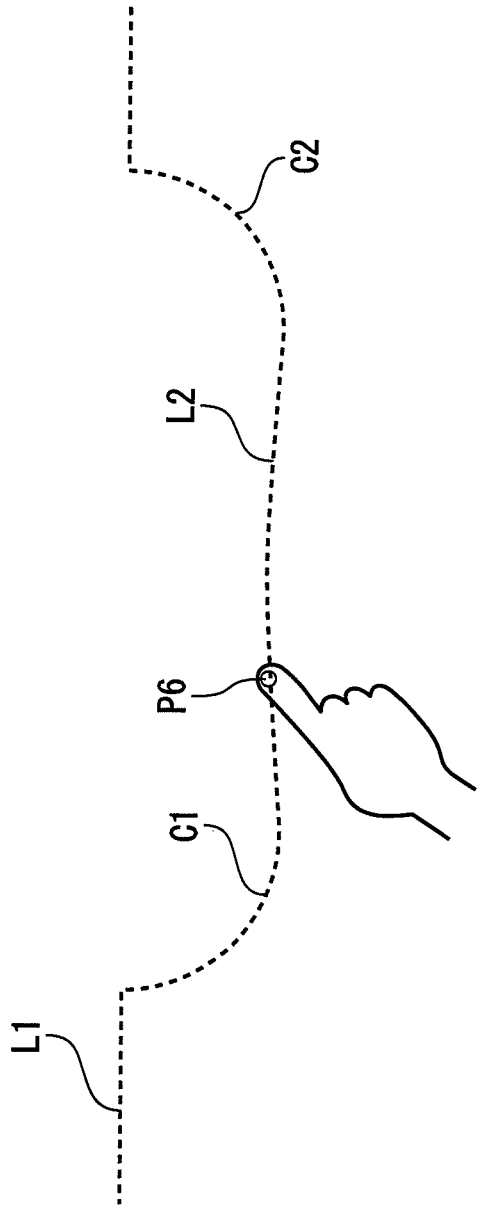
FIG. 29 is a diagram showing one example of a message screen for selecting a calculation range of a peak point.

The user touches data in the vicinity of the calculation range of the peak point (see FIG. 29).

Since the shape analysis apparatus 400 completes selection instructions by the user, automatic generation of an evaluation range is then executed (ST360). That is, the evaluation range generating part 450 generates the evaluation range in which a data point string is traced from a clicked data point P6 and the peak point is calculated.

When the properties targeted for evaluation are the peak point herein, the evaluation range generating part 450 obtains an inclination (differential coefficient) and searches a point at which a positive and a negative of the inclination (differential coefficient) is inverted, that is, an inflection point.

For example, the inclination (differential coefficient) at the point P6 which is the clicked data point is positive.

Figure 30:
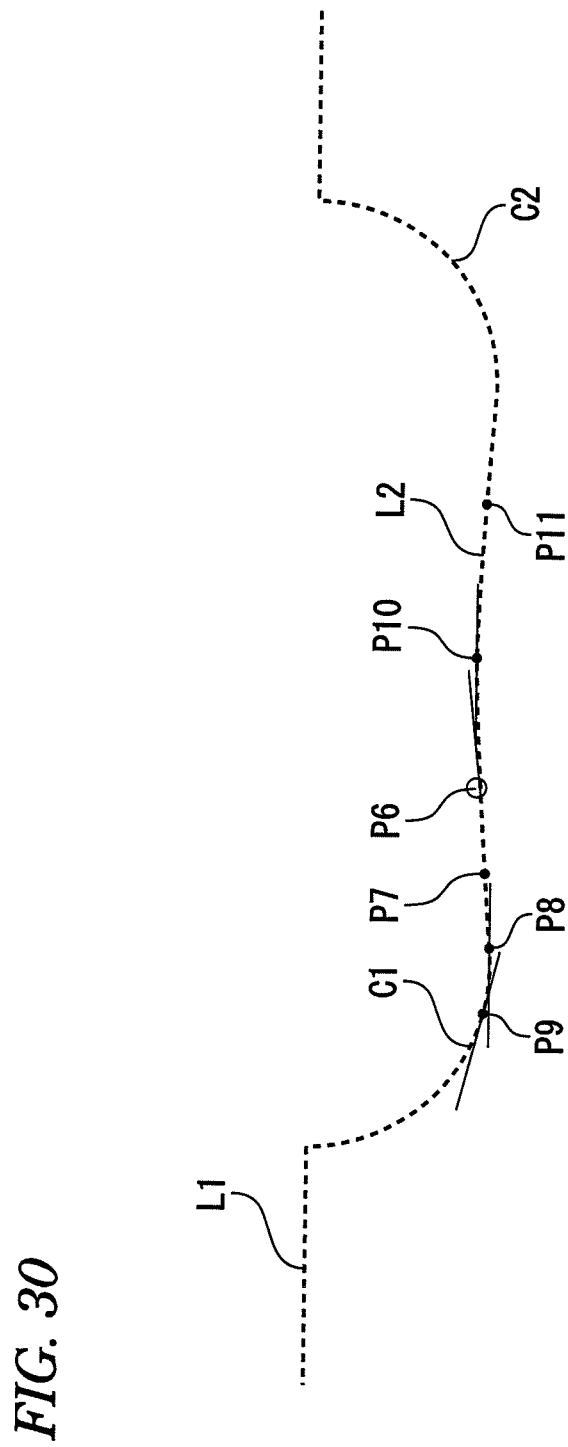
FIG. 30 is a diagram showing a situation in which inflection points are searched.
Figure 31:
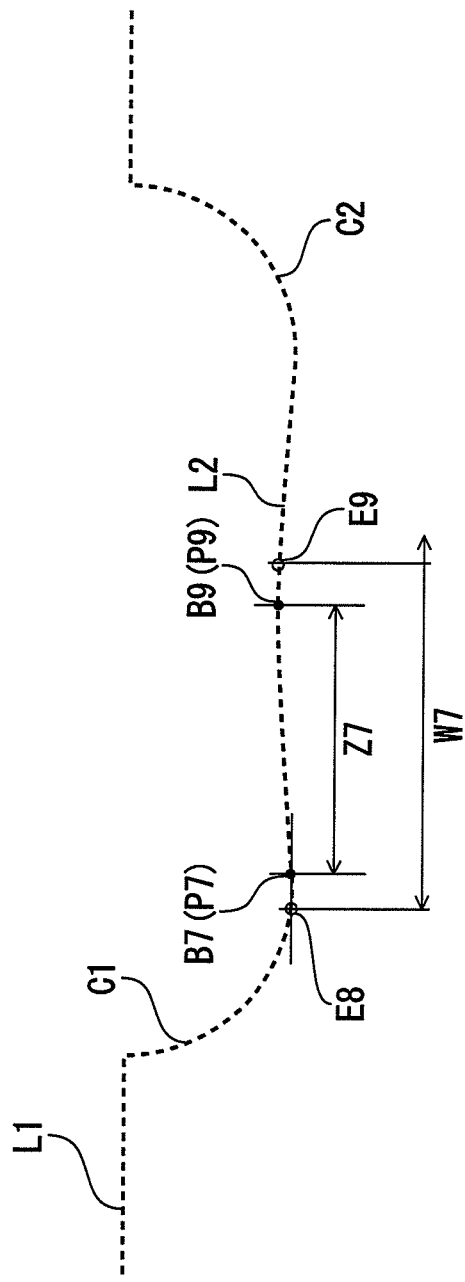
FIG. 31 is a diagram showing a state in which boundary points are calculated.

In FIG. 30, when a data string is traced in a left direction from the point P6, an inclination is still positive at a point P7, but the inclination (differential coefficient) becomes zero at a point P8 and further becomes negative at a point P9. Consequently, an inflection point of the left side when viewed from the point P6 is the point P8. On the other hand, when the data string is traced in a right direction from the point P6, the inclination (differential coefficient) becomes zero at a point P10 and further becomes negative at a point P11. Consequently, an inflection point of the right side when viewed from the point P6 is the point P10. After the inflection point P8 and the inflection point P10 are obtained in this manner, an interval Z7 sandwiched between a boundary point P8 and a boundary point P10 is obtained using these inflection points P8, P10 as the boundary points (FIG. 31).

Next, in priorities of the evaluation range, an "x-direction range" is specified as the first priority for the peak point (FIG. 12). Consequently, the evaluation range generating part 450 shifts the boundary points B8, B10 along an x direction by a specified amount. As the shift amount, the shift amount in the x direction is set at 1.0 mm as shown in FIG. 13.

In the case of generating the evaluation range in which the peak point is calculated herein, the boundary points B8, B10 are moved (shifted) toward the outside of the interval Z7. When the boundary points B8, B10 are moved toward the inside of the interval Z7, it will easily be understood that an inflection point which is a main candidate for the peak point (or bottom point) deviates from the evaluation range. The range sandwiched between an edge point E8 and an edge point E10 which are points shifting the boundary points B8, B10 is obtained as an evaluation range W7 (ST360). The evaluation range generating part 450 outputs the evaluation range W7 obtained in this manner to the geometric property computing part 460.

After the evaluation range is defined, the geometric property computing part 460 obtains a point with the largest z coordinate value in data in the evaluation range W7 and sets this point at the peak point (ST370). The coordinate value of the peak point obtained is displayed on the touch panel as an evaluated value (ST380).

It will easily be understood that some modification of the third operation example of obtaining the peak point can simply be used as an operation example of obtaining the bottom point. Also, the peak point and the bottom point may be obtained simultaneously.

As shown in this operation example, the embodiment further has the following effects in addition to the above effects (1) to (5).

(6) In the case of obtaining the peak point or the bottom point thus, a proper evaluation range can be automatically generated using an inflection point as the reference.

At this time, the inflection point is further shifted to the outside of an interval, so that a proper evaluation range can be obtained so as to include a candidate for the peak point or the bottom point.

Example of Other Evaluation Range

The x-direction range and the z-direction range have been described in the first to third operation examples described above. Consequently, the case where an evaluation range is a rectangular range and a data string direction range is supplemented. First, the case where the evaluation range is the rectangular range will be described.

Case where Evaluation Range is Rectangular Range

Setting an evaluation range in a rectangular range means that both of the x-direction range and the z-direction range are decided.

Consequently, in operation of the case where the evaluation range is the rectangular range, both of the operation of generating the x-direction range and the operation of generating the z-direction range could be executed to set the range of overlap between the x-direction range and the z-direction range in the rectangular range.

Figure 32:
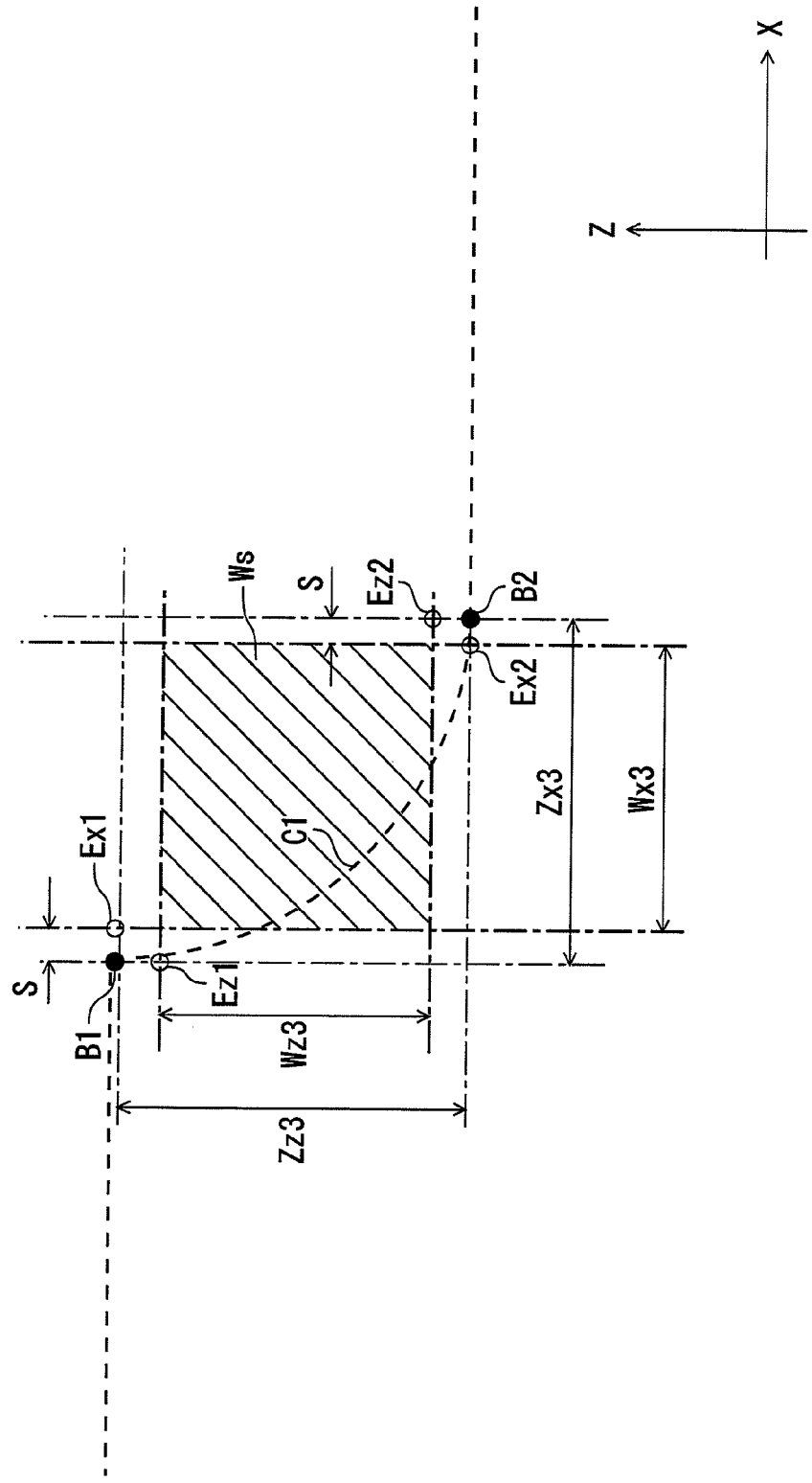
FIG. 32 is a diagram showing one example of a rectangular range.

For example, it is assumed that a point at which a roundness tolerance deviates from a tolerance set value (for example, 1.0 mm) is obtained as boundary points B1, B2 in FIG. 32.

In order to generate an x-direction range as an evaluation range, the boundary points B1, B2 are shifted to the inside of an interval Zx3 along an x direction by a predetermined value. The range obtained in this manner is set in an x-direction range Wx3. Further, in order to generate a z-direction range, the boundary points B1, B2 are shifted to the inside of an interval Zz3 along a z direction by a predetermined value.

The range obtained in this manner is set in a z-direction range Wz3. The range of overlap between the x-direction range Wx3 and the z-direction range Wz3 is set in a rectangular evaluation range Ws. It will be understood that the rectangular evaluation range is generated in this manner.

Modified Example

The rectangular range is generated by creating the x-direction range and the z-direction range and using the range of overlap between the x-direction range and the z-direction range, and after both of the x-direction range and the z-direction range are created, only one of the x-direction range and the z-direction range may be used. For example, the wider range or the narrower range of both of the x-direction range and the z-direction range may be used.

Case where Evaluation Range is Data String Direction Range

Figure 33:
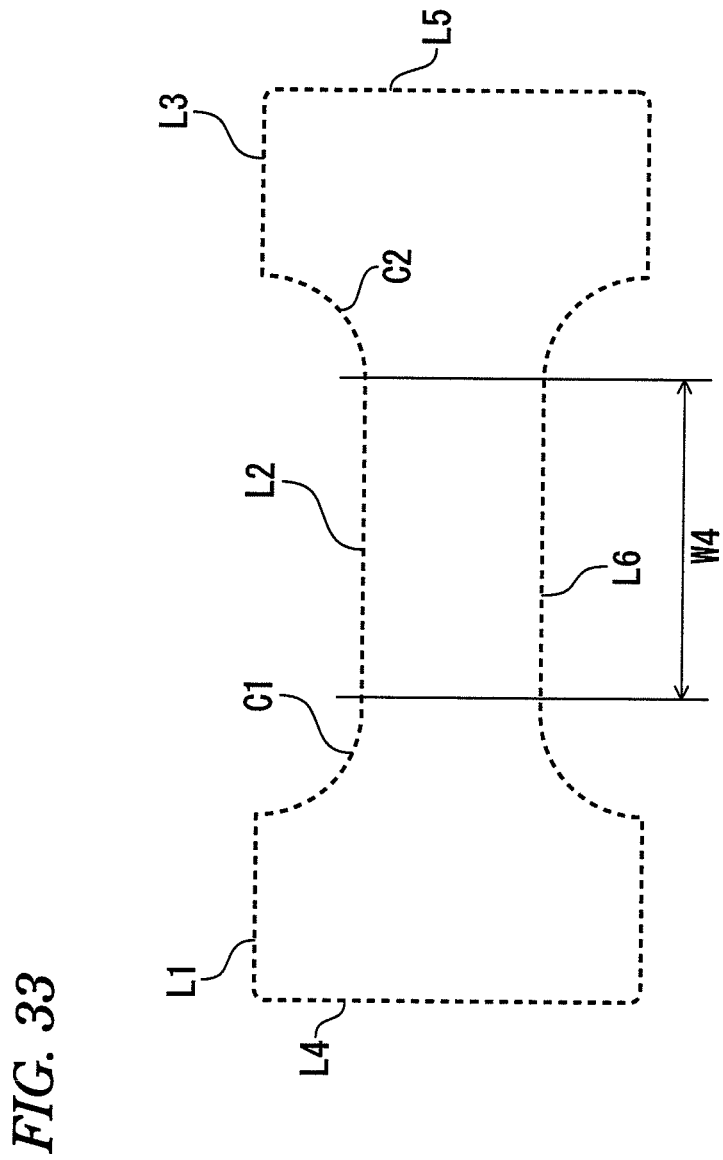
FIG. 33 is a diagram showing one example of measured data targeted for evaluation.

Setting an evaluation range in a data string direction range means that coordinate axes such as the x axis or z axis set in a machine are not used as the reference but an arrangement direction of measured data is used as the reference. When the whole periphery of one work is measured, for example, a data string with a closed shape as shown in FIG. 33 is obtained as contour shape data. Here, straightness of a line segment L2 shall want to be evaluated as shown in the first operation example. At this time, use of an x-direction range as the evaluation range causes a problem. This is because the x-direction range W4 includes data of a line segment L6 forming a lower surface in addition to the line segment L2 forming an upper surface.

Figure 34:
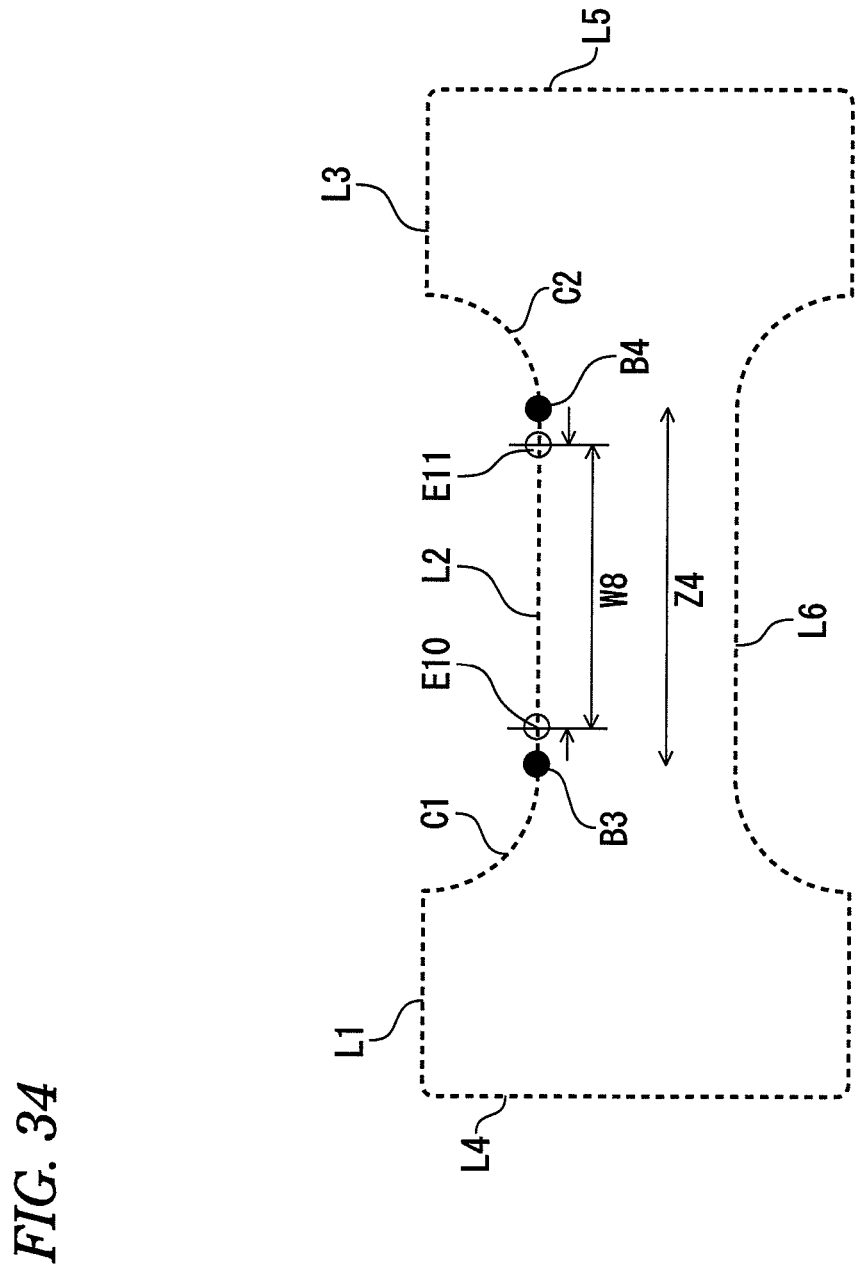
FIG. 34 is a diagram showing one example of a data string direction range.
Figure 35:
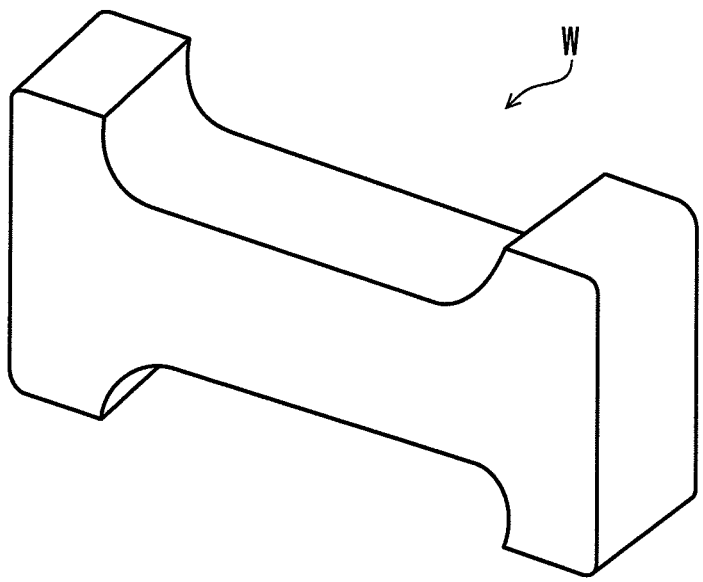
FIG. 35 is a diagram showing one example of work.
Figure 36:
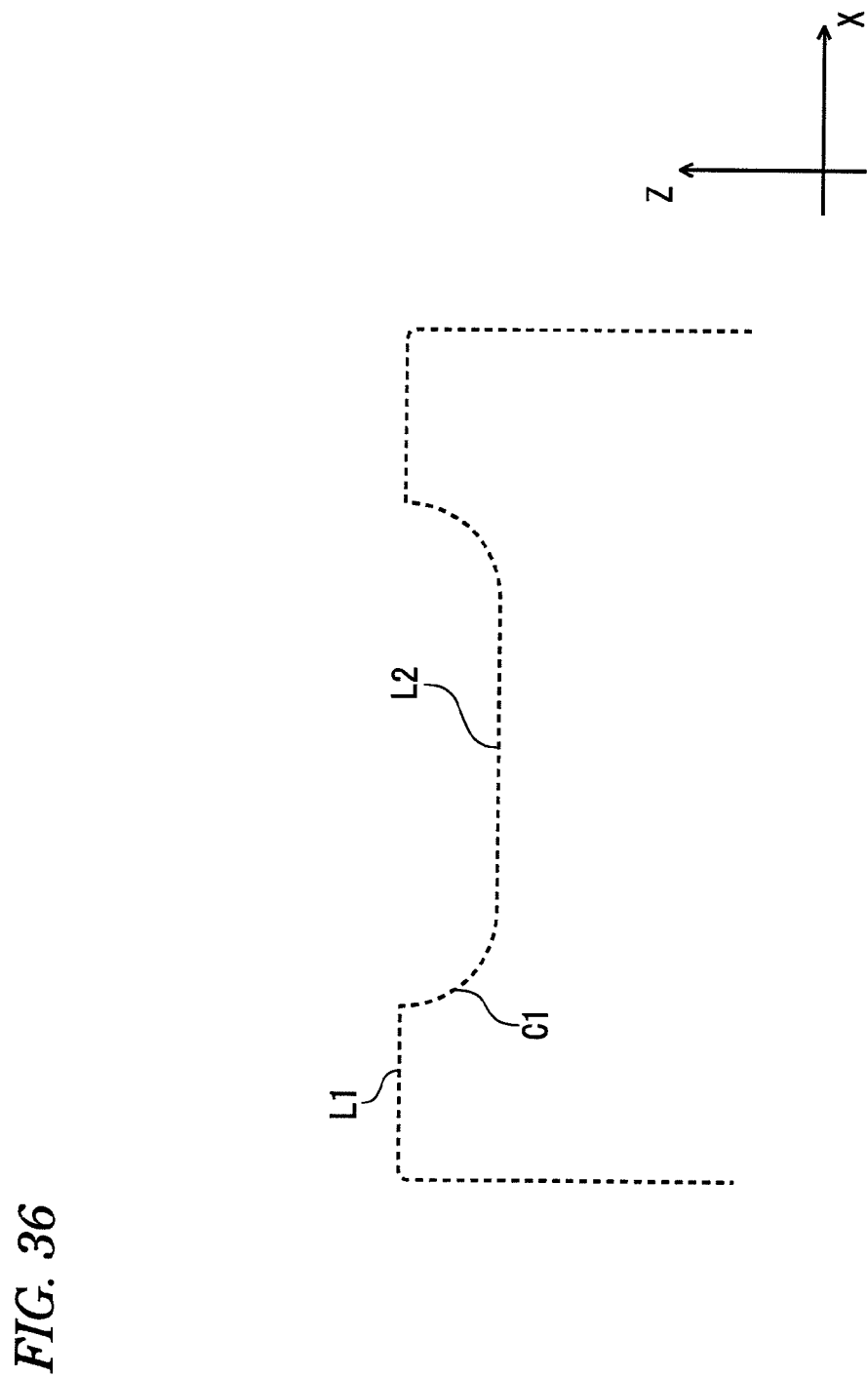
FIG. 36 is a diagram showing one example of measured data.
Figure 37:
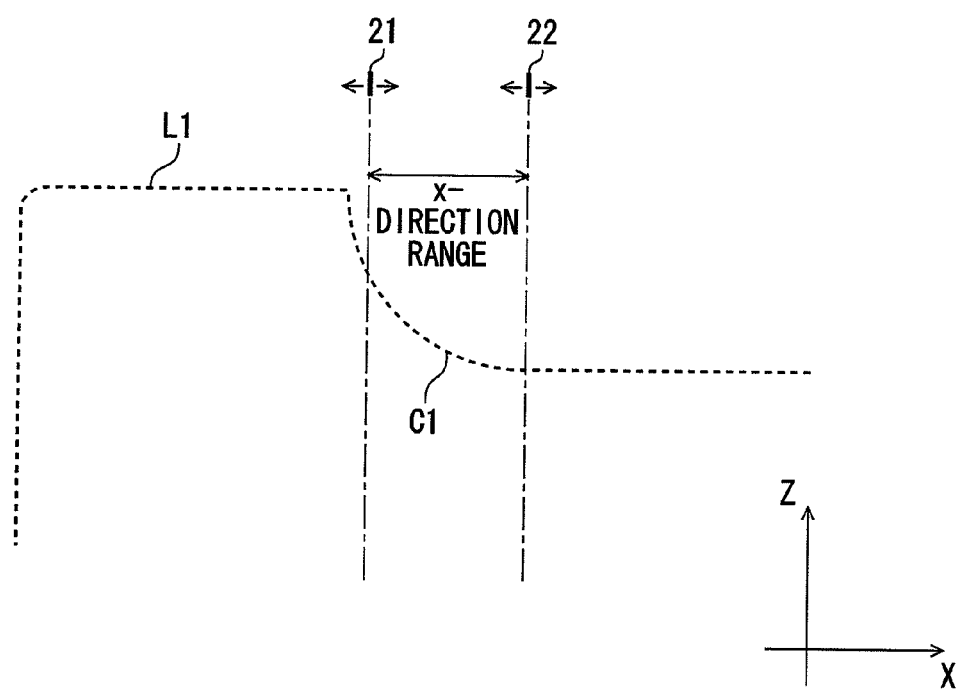
FIG. 37 is a diagram showing a situation in which an x-direction range is specified by a conventional method.
Figure 38:
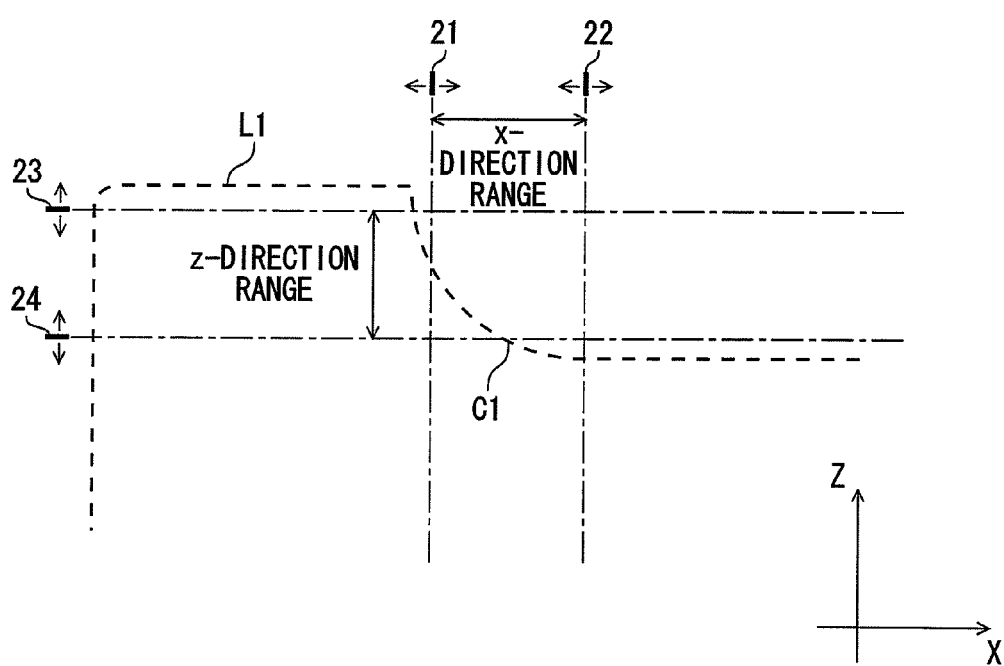
FIG. 38 is a diagram showing a situation in which a z-direction range is specified by a conventional method.
Figure 39:
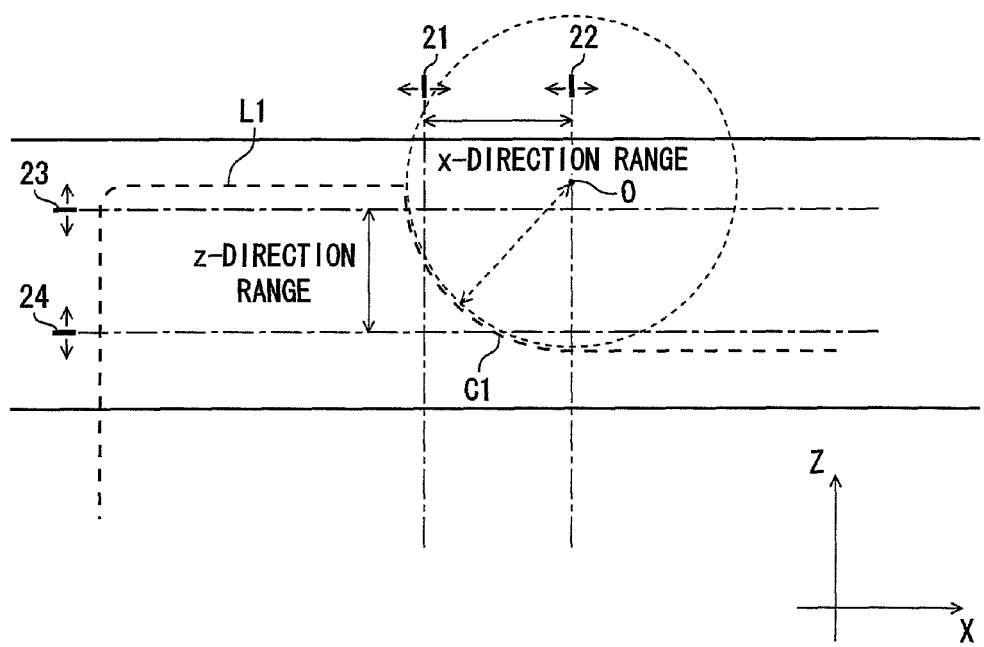
FIG. 39 is a diagram showing a situation in which shape analysis is made.
Figure 40:
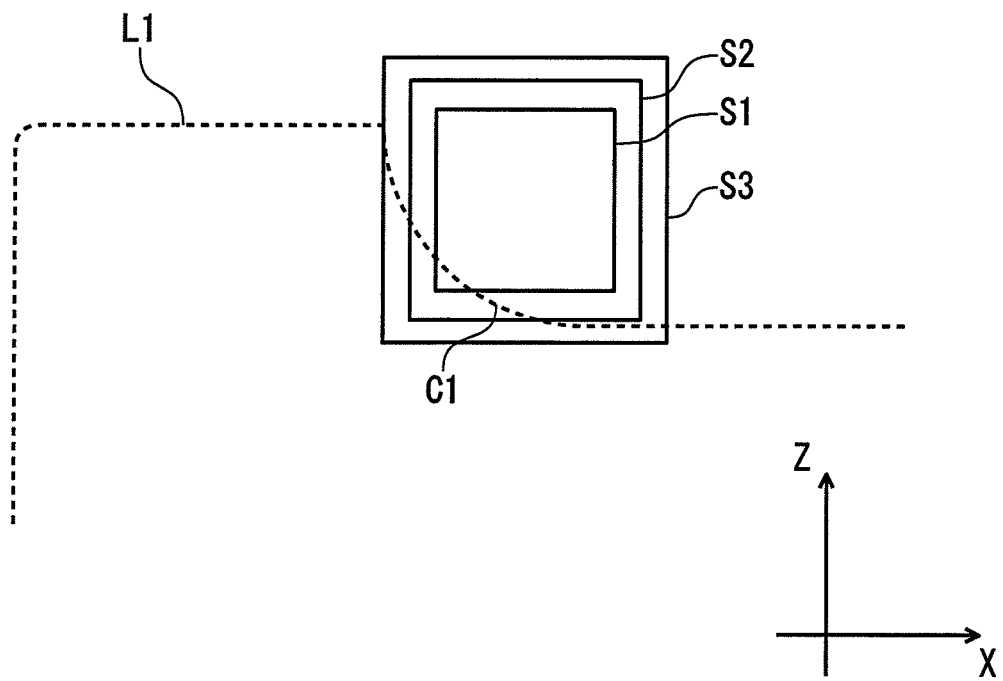
FIG. 40 is a diagram showing an example of different evaluation ranges.

Hence, as shown in FIG. 34, boundary points B3, B4 are shifted to the inside of an interval Z4 along arrangement of the data string rather than the x direction or z direction. Then, an edge point E10 and an edge point E11 which are points shifted along the data string are obtained. Data is traced between the edge point E10 and the edge point E11 in the data arrangement direction, and data sandwiched between the edge point E10 and the edge point E11 is a data string direction range W8.

This range becomes the evaluation range.

The evaluation range including only data targeted for evaluation accurately can be obtained by using the data string direction range thus.

In addition, the invention is not limited to the embodiment described above, and modifications can properly be made without departing from the gist.

In the embodiment described above, the shift amount is given by the dimension itself of length such as 1.0 mm, but may be specified by a ratio such as % (percent). For example, it may be specified so that a length of, for example, 10% with respect to a length of an interval sandwiched between boundary points is the shift amount.

In the case of being mounted in an actual machine, it could be constructed so that a convenient PART program can be registered. For example, an evaluation item is generally decided every kind of work.

Consequently, for example, a PART program of shape analysis corresponding to a model number of work may be registered. That is, a work model number, an evaluation item (evaluation target properties), a target data region, a geometric element, etc. are registered in this PART program as a package. A set value of an evaluation range generation condition may be changed every evaluation target property.

When a user inputs a model number of work targeted for evaluation, this PART program is automatically called and a shape is automatically evaluated. When work is measured continuously one after another, a shape is automatically analyzed every time contour shape data is acquired. An assembly line consistent from measurement to evaluation can be formed.

Conditions for generating the evaluation range may be set by a user or may be set automatically from the evaluation range used in the past.

For example, the user shall set an x-direction range or a z-direction range by a conventional method. Then, conditions necessary to automatically generate this evaluation range can be back calculated and obtained.

That is, a tolerance threshold, priorities of the evaluation range and a shift amount are determined. It may be constructed so that the tolerance threshold, the priorities of the evaluation range and the shift amount determined in this manner are stored and are called by the user as necessary.

Also, it may be constructed so that an "optimization" button is prepared and optimum conditions can be automatically generated from accumulated data of the evaluation ranges set in the past by the conventional method. For example, it may be constructed so that the most frequent value or the average of the past accumulated data is used as the tolerance threshold and the shift amount. The priorities of the evaluation range could be determined based on frequency used in the past.

It could be constructed so that geometric elements used during shape analysis can be stored. That is, it could be constructed so that the line segment L4e or L1e can be stored.

What is claimed is:
1. A shape analysis method:
moving a probe which contacts with a workpiece;
acquiring a shape data related to a contour shape of the workpiece by using a sensor which detects a position of the probe;
storing the shape data in a memory;
deciding a geometric element used in shape analysis, the geometric element being selected from a circle or a straight line;
setting a roundness threshold as a threshold condition of a preset shape tolerance in case that the circle is selected as the geometric element;
setting a straightness threshold as the threshold condition of the preset shape tolerance in case that the straight line is selected as the geometric element;
deciding one data point among the shape data;
applying the selected geometric element to a first interval, among the shape data, including the one data point;
searching the widest interval that satisfies the threshold condition of the preset shape tolerance while changing a width of the first interval;
determining a first boundary point of the shape data that is on one end of the widest interval and a second boundary point of the shape data that is on the other end of the widest interval;
corresponding to the probe position, setting a first shift amount along a first direction, a second shift amount along a second direction orthogonal to the first direction, and a third shift amount along the probe position corresponding data string direction of the shape data to shift the first and second boundary points;

corresponding to the probe position, obtaining first and second edge points by shifting each of the first and second boundary points by one of the first, second and third shift amounts in opposite directions along the corresponding first, second or the probe position corresponding data string direction of the one of the first, second and third shift amounts shifting the first boundary point by a preset shift amount to obtain a first edge point, and shifting the second boundary point by the preset shift amount to obtain a second edge point so that a range sandwiched between the first and second edge points is narrower than the widest interval of the shape data;

and targeting the shape data only within the range sandwiched between the first and second edge points as an evaluation range for calculation of geometric properties.

2. The shape analysis method according to claim 1, wherein a user touches one point of the shape data displayed on a touch panel display part and thereby the one data point to be included in the evaluation range is specified.

3. The shape analysis method according to claim 1, wherein:

the evaluation range is any one selected from among an x-direction range having a width in an x direction as the first direction, a z-direction range having a width in a z direction as the second direction, a rectangular range having widths in the x direction and the z direction, and a data string direction range having a width along an arrangement direction of the shape data string as the data string direction; and selected priority is preset by a user.

4. The shape analysis method according to claim 1, wherein the shift amount is set as a length dimension or a ratio of the interval to length.

5. A shape analysis method, in a case of obtaining a peak point or a bottom point within an evaluation range, the method comprising:

moving a probe which contacts with a workpiece;
acquiring a shape data related to a contour shape of the workpiece by using a sensor which detects a position of the probe;
storing the shape data in a memory;
deciding one data point among the shape data;
calculating an inclination of the shape data at each point for a first interval, among the shape data, including the one data point;
searching a second interval sandwiched between two points at which the calculated inclination becomes zero while changing a width of the first interval;
pinpointing first and second boundary points between which the second interval found by the search is sandwiched;
corresponding to the probe position, setting a first shift amount along a first direction, a second shift amount along a second direction orthogonal to the first direction, and a third shift amount along the probe position corresponding data string direction of the shape data to shift the first and second boundary points;
corresponding to the probe position, obtaining a first and second edge points by shifting each of the first and second boundary points by one of the first, second and third shift amounts in opposite directions along the corresponding first, second or the probe position corresponding data string direction of the one of the first, second and third shift amounts so that a range sandwiched between the first and second edge points is wider than the second interval;
setting a range sandwiched between the first and second edge points as the evaluation range; and
targeting the shape data within the evaluation range and calculating the peak point or the bottom point.

6. A non-transitory recording medium for storing a shape analysis program, the shape analysis program causing a computer to execute the steps of:

moving a probe which contacts with a workpiece;
acquiring a shape data related to a contour shape of the workpiece by using a sensor which detects a position of the probe;
storing the shape data in a memory;
deciding a geometric element used in shape analysis, the geometric element being selected from a circle or a straight line;
setting a roundness threshold as a threshold condition of a preset shape tolerance in case that the circle is selected as the geometric element;
setting a straightness threshold as the threshold condition of the preset shape tolerance in case that the straight line is selected as the geometric element;
deciding one data point among the shape data;
applying the selected geometric element to a first interval, among the shape data, including the one data point;
searching the widest interval that satisfies the threshold condition of the preset shape tolerance while changing a width of the first interval;
determining a first boundary point of the shape data that is on one end of the widest interval and a second boundary point of the shape data that is on the other end of the widest interval;
corresponding to the probe position, setting a first shift amount along a first direction, a second shift amount along a second direction orthogonal to the first direction, and a third shift amount along the probe position corresponding data string direction of the shape data to shift the first and second boundary points;
corresponding to the probe position, obtaining first and second edge points by shifting each of the first and second boundary points by one of the first, second and third shift amounts in opposite directions along the corresponding first, second or the probe position corresponding data string direction of the one of the first, second and third shift amounts so that a range sandwiched between the first and second edge points is narrower than the widest interval of the shape data; and
targeting the shape data only within the range sandwiched between the first and second edge points for calculation of geometric properties.

7. A non-transitory recording medium for storing a shape analysis program, in a case of obtaining a peak point or a bottom point within an evaluation range, the shape analysis program causing a computer to execute the steps of:

moving a probe which contacts with a workpiece;
acquiring a shape data related to a contour shape of the workpiece by using a sensor which detects a position of the probe;
storing the shape data in a memory;
deciding one data point among the shape data;
calculating an inclination of the shape data at each point for a first interval, among the shape data, including the one data point;
searching a second interval sandwiched between two points at which the calculated inclination becomes zero while changing a width of the first interval;

pinpointing first and second boundary points between which the second interval found by the search is sandwiched;

corresponding to the probe position, setting a first shift amount along a first direction, a second shift amount along a second direction orthogonal to the first direction, and a third shift amount along the probe position corresponding data string direction of the shape data to shift the first and second boundary points;

corresponding to the probe position, obtaining a first and second edge points by shifting each of the first and second boundary points by one of the first, second and third shift amounts in opposite directions along the corresponding first, second or the probe position corresponding data string direction of the one of the first, second and third shift amounts so that a range sandwiched between the first and second edge points is wider than the second interval;

setting a range sandwiched between the first and second edge points as the evaluation range; and targeting the shape data within the evaluation range and calculating the peak point or the bottom point.

* * * * *